United States Patent [19]

Meier

[11] 3,930,142

[45] Dec. 30, 1975

[54] DIGITAL TIMER AND COUNTER DEVICE WITH DUAL CONTROL

[75] Inventor: Carl H. Meier, Davenport, Iowa

[73] Assignee: Gulf & Western Industries, Inc., New York, N.Y.

[22] Filed: June 13, 1974

[21] Appl. No.: 478,979

[52] U.S. Cl. ....... 235/92 EV; 235/92 T; 235/92 CA

[51] Int. Cl.$^{2}$ .......................................... H03K 21/00

[58] Field of Search ....... 235/92 CA, 92 EV, 92 PC, 235/92 T, 92 R, 92 CC, 92 TF; 328/44, 48

[56] References Cited

UNITED STATES PATENTS

| | | | |
|---|---|---|---|
| 3,317,716 | 5/1967 | Ducote | 235/92 EV |
| 3,500,022 | 3/1970 | Toscano | 235/92 EV |
| 3,691,353 | 9/1972 | Michaud | 235/92 EV |
| 3,824,378 | 7/1974 | Johnson et al. | 235/92 CA |

*Primary Examiner*—Gareth D. Shaw
*Assistant Examiner*—John P. Vandenburg
*Attorney, Agent, or Firm*—Meyer, Tilberry & Body

[57] ABSTRACT

A digital counting device for counting input pulses for either timing or counting. This device comprises a binary counter responsive to input counts and having a first mode select means for causing up binary counting of the counter upon receipt of input counts and a second mode select means for causing down binary counting of the counter upon receipt of input counts. A binary memory circuit is provided with means interconnecting the binary counter and the binary memory circuit for creating a compare signal when the binary number of the binary counter corresponds to the binary number of the memory circuit. A sense signal is created when the binary counter reaches a select number, such as zero. Means responsive to either the compare signal or the sense signal creates an output signal when the memory and counter reach comparison or when the counter reaches zero. There is provided first control means including means for loading a selected coded number into the counter and means for activating the down counting mode select means and second control means including means for loading a selected number into the memory circuit and means for activating the up counting mode select means. By selecting one of these control means and introducing input pulses to the counter, the counter can count up to the loaded memory number or count down to zero in the counter.

81 Claims, 24 Drawing Figures

| M1 | M2 | M3 | N | X |
|---|---|---|---|---|
| 0 | 0 | 1 | 6/5 | 0 |
| 0 | 1 | 1 | 12 | 0 |
| 1 | 0 | 1 | 120 | 1 |
| 1 | 1 | 1 | 1 | 0 |
| 0 | 0 | 0 | 72 | 0 |
| 0 | 1 | 0 | 10 | 0 |
| 1 | 0 | 0 | 100 | 1 |
| 1 | 1 | 0 | 1000 | 0 |
FIG. 2
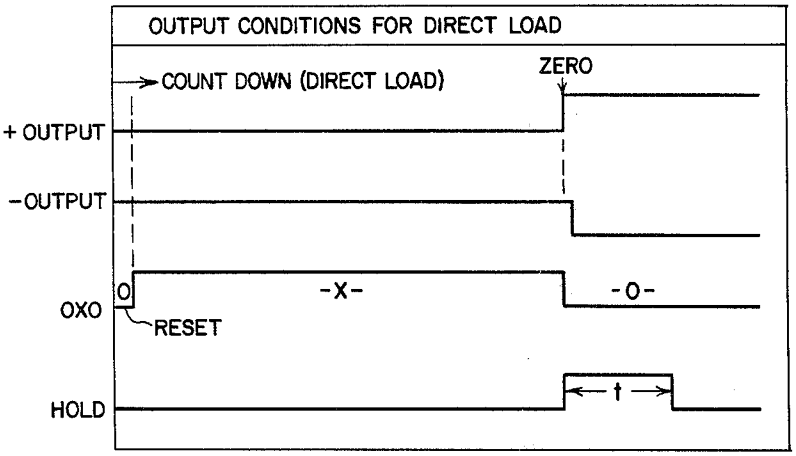
FIG. 3
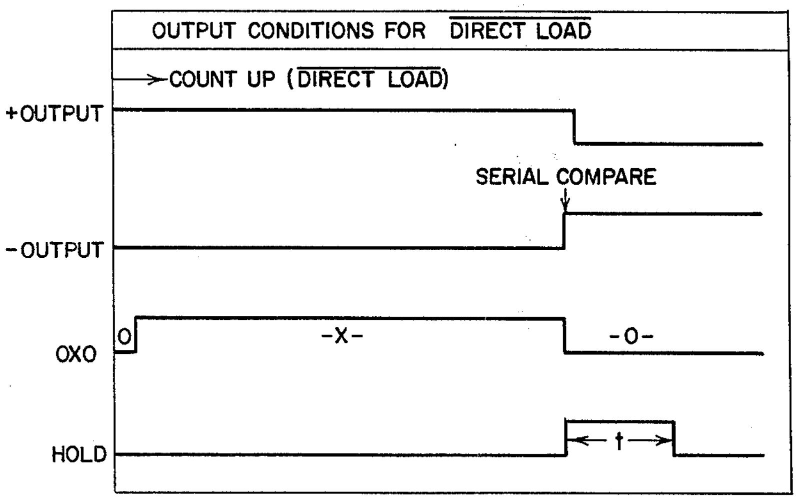
FIG. 4

(DIGITAL DIFFERENTIATOR CIRCUIT)

POINT L = 0 WHEN POINT C = 1

| UP COUNT (80) | | Ø1 | Ø2 | A | B | C | D | E | F | G | H | I | J | K | L | M |
|---|---|---|---|---|---|---|---|---|---|---|---|---|---|---|---|---|
| 1 | 0 | 1 | 0 | 0 | 1 | 1 | 0 | 0 | 0 | ~ | ~ | ~ | ~ | ~ | 0 | 1 |
| 2 | 0 | 0 | 1 | 0 | 0 | 1 | 0 | 1 | 0 | 0 | 1 | 0 | 0 | ~ | 0 | 1 |
| 3 | 0 | 1 | 0 | 0 | 1 | 1 | 0 | 0 | 0 | 0 | 1 | 0 | 1 | 0 | 0 | 1 |
| 4 | 0 | 0 | 1 | 0 | 0 | 1 | 0 | 1 | 0 | 0 | 1 | 0 | 0 | 0 | 0 | 1 |
| 5 | 0 | 1 | 0 | 0 | 1 | 1 | 0 | 0 | 0 | 0 | 1 | 0 | 1 | 0 | 0 | 1 |
| 6 | 0 | 0 | 1 | 0 | 0 | 1 | 0 | 1 | 0 | 0 | 1 | 0 | 0 | 0 | 0 | 1 |
| 7 | 1 | 1 | 0 | 1 | 0 | 0 | 1 | 0 | 0 | 0 | 1 | 0 | 1 | 0 | 1 | 0 |
| 8 | 1 | 0 | 1 | 0 | 0 | 0 | 1 | 0 | 1 | 1 | 0 | 0 | 0 | 0 | 1 | 0 |
| 9 | 1 | 1 | 0 | 1 | 0 | 0 | 1 | 0 | 0 | 1 | 0 | 1 | 0 | 1 | 0 | 1 |
| 10 | 1 | 0 | 1 | 0 | 0 | 0 | 1 | 0 | 1 | 1 | 0 | 0 | 0 | 1 | 0 | 1 |
| 11 | 0 | 1 | 0 | 0 | 1 | 1 | 0 | 0 | 0 | 1 | 0 | 1 | 0 | 1 | 0 | 1 |
| 12 | 0 | 0 | 1 | 0 | 0 | 1 | 0 | 1 | 0 | 0 | 1 | 0 | 0 | 1 | 0 | 1 |
| 13 | 0 | 1 | 0 | 0 | 1 | 1 | 0 | 0 | 0 | 0 | 1 | 0 | 1 | 0 | 0 | 1 |
| 14 | 0 | 0 | 1 | 0 | 0 | 1 | 0 | 1 | 0 | 0 | 1 | 0 | 0 | 0 | 0 | 1 |
| 15 | 0 | 1 | 0 | 0 | 1 | 1 | 0 | 0 | 0 | 0 | 1 | 0 | 1 | 0 | 0 | 1 |
| 16 | 0 | 0 | 1 | 0 | 0 | 1 | 0 | 1 | 0 | 0 | 1 | 0 | 0 | 0 | 0 | 1 |
| 17 | 1 | 1 | 0 | 1 | 0 | 0 | 1 | 0 | 0 | 0 | 1 | 0 | 1 | 0 | 1 | 0 |
| 18 | 1 | 0 | 1 | 0 | 0 | 0 | 1 | 0 | 1 | 1 | 0 | 0 | 0 | 0 | 1 | 0 |
| 19 | 0 | 1 | 0 | 0 | 1 | 1 | 0 | 0 | 0 | 1 | 0 | 1 | 0 | 1 | 0 | 1 |
| 20 | 0 | 0 | 1 | 0 | 0 | 1 | 0 | 1 | 0 | 0 | 1 | 0 | 0 | 0 | 0 | 1 |
| 21 | 0 | 1 | 0 | 0 | 1 | 1 | 0 | 0 | 0 | 0 | 1 | 0 | 1 | 0 | 0 | 1 |
| 22 | 0 | 0 | 1 | 0 | 0 | 1 | 0 | 1 | 0 | 0 | 1 | 0 | 0 | 0 | 0 | 1 |

(INPUT CIRCUITS AND SCALER COUNTERS)

(COUNTER UP-DOWN CONTROL CIRCUIT)

(MEMORY-COUNTER CIRCUIT AND COMPARE AND DISPLAY OUTPUTS)

DIGITAL TIMER AND COUNTER DEVICE WITH DUAL CONTROL

The invention relates to the art of timers and counters and more particularly to an improved digital counter and timer device which can count up or down in response to selected input pulses.

The invention applies particularly to a digital counter and timer device used in industrial counting and timing operations, and it will be described with particular reference thereto; however, it is appreciated that the invention is broader and can be used in various types of counting and timing systems.

BACKGROUND OF THE INVENTION

Industrial machinery and processing equipment often requires various timers and counters for controlling the operation of the machinery and the process. Up until recently, these timers have generally included synchronous motors and switch means for indicating when the synchronous motor has operated for a selected time. Such timers require complicated clutches, gearing and output cams. In addition, they are relatively large. However, these mechanical timers have been widely accepted and are still generally used in industrial controls.

Recently, digital timers have been developed for industrial use. These timers employ a clocking pulse which is directed to a digital, binary counter for counting the counter to a set number which is the timing interval. By providing pulse dividers on the incoming clocking pulses, the range of the timer can be changed. By connecting these digital timers to random input pulses instead of uniform clocking pulses the timers can be converted to a counter for performing a counting operation on the input pulses. Consequently, the new digital timers can be used as either a timer or a counter according to the type of input pulses. These devices, which are now being widely used, have been made quite economical by the advancement in the integrated circuit technology wherein several thousand gates or logic junctions can be provided on a single large signal integrated circuit chip, i.e. LSI chip, applying MOS-FET technology. All of the counting and control logic can be designed into a single chip or into a few number of these chips. By the easy procedure of changing the input pulse from a standard clocking pulse to random pulses, the digital device can be changed from an interval timer to a counter.

These digital timer/counter devices use binary counting for both timing and counting; therefore, this type device will hereinafter be referred to basically as a "counter". It is realized that by placing a uniform clocking pulse onto the device, the device is converted into a timer. By selecting the rate by which a standard input clocking pulse is divided before application to the internal counter of a LSI chip counter/timer, the timing interval of the timer can be controlled.

In the past, the digital counters, especially those using LSI chips, have generally included an internal binary counter, a programmable divider for changing the frequency of the input pulses, a display device for displaying the number in the counter at any given time, a thumbwheel arrangement for loading the desired interval or counts into the internal counter, and an output signal creating means responsive to a given number of counts being counted by the counter. The internal binary counter has sufficient stages to receive binary coded decimal (BCD) information from a fixed number of thumbwheel decoding circuits. After the thumbwheel set number is loaded into the internal counter stages, the internal counter is counted down until the counter reaches zero. An output pulse is then produced to reset the counter and control external circuits. Such a timer/counter device could be used in a repeat mode so that the counter would automatically cycle from zero to the thumbwheel selected number and again count down to zero. This type of counting operation could be used for counting as well as timing and has proven quite successful in industry. A timer/counter device of the type to which the present invention is directed is disclosed in prior U.S. patent applications Ser. Nos. 251,774 and 251,775 filed May 9, 1972, now U.S. Pat. Nos. 3,789,195 and 3,867,614, respectively. These patents are incorporated by reference herein.

SUMMARY OF THE INVENTION

The present invention relates to an improvement over the prior digital counting devices of the type adapted for using LSI chips produced in accordance with the MOS-FET technology. In accordance with the present invention, there is provided a digital counting device including a binary counter responsive to input counts and having two selectable types of operation. The single counter can count up or count down upon receipt of input counts to the counter. A binary memory circuit is provided with means for interconnecting the various stages of the binary counter with corresponding stages of the binary memory circuit. A comparison signal is created when the binary number of the counter corresponds to the binary number of the memory circuit. As was used in the past, a sense signal is created when the binary counter reaches a given number, such as zero. Means responsive to either the compare signal or the sense signal is used for creating an output signal indicating that the counter and memory have been compared or that the counter has counted down to the given number.

In accordance with one aspect of the invention, the standard binary coded decimal binary information is created by an appropriate means, such as a thumbwheel decoding network, and directed to both the memory circuit and the binary counter. When operated in a first mode, designated as the "DIRECT LOAD" or "LOAD DIRECT" mode, the binary coded decimal information from the thumbwheel network is loaded into the binary counter and the counter is operated in the down counting mode. Consequently, at the end of a selected interval, a sense signal is created to produce a desired output signal. In accordance with another operating mode, known as "$\overline{\text{DIRECT LOAD}}$," or "$\overline{\text{LOAD DIRECT}}$" the thumbwheel information is loaded directly into the memory circuit. Thereafter, the counter which is reset to zero is counted up upon receipt of incoming counts until the set memory number is reached. Thereafter, a compare signal is created to produce the output signal from the counter. Consequently, the present invention can be used for counting up to a selected number or for counting down from a selected number. Appropriate outputs are controlled by the output signal to provide a variety of output functions.

In accordance with another aspect of the present invention, the digital counting device is provided with means for allowing the counter to count beyond the output signal condition. In this manner, if desired, the counter may count below zero to produce a negative output indication. Also, when counting up toward a memory number, the output signal can be reached and then the counter can continue to count. This produces the total time which has elapsed and an output signal at a selected time.

The present invention provides a combination of up counting and down counting so that the digital counting device can be used as a totalizer with counts being successively added to and subtracted from the counter. There is provided, and in accordance with another aspect of the invention, a visual display which continuously indicates the counts within the internal binary counter. Other features are also provided by the present invention, and they will become apparent in the following description of the preferred embodiment of the invention.

OBJECTS OF INVENTION

The primary object of the present invention is the provision of a digital counting/timing device of the type using an LSI chip, which device is capable of counting up to a number or counting down to a number, such as zero.

Another object of the present invention is the provision of a digital counting/timing device of the type using an LSI chip, which device includes an internal memory circuit and a binary counting means for counting pulses up to a number loaded into a memory circuit.

Yet another object of the present invention is the provision of a digital counting/timing device of the type using an LSI chip which device can count beyond a set number loaded into the device.

Yet another object of the present invention is the provision of a digital counting/timing device of the type described above, which device can be used as a totalizer by counting up and counting down internally of the device during a single interval or cycle.

Still another object of the present invention is the provision of a digital counting/timing device of the type using an LSI chip, which device has two output terminals that change logic states to indicate the progress of the device in a given counting cycle.

Still a further object of the present invention is the provision of a digital counting/timing device of the type described above, which device has a first input to initiate up counting of the device and a second input for initiating down counting of the device.

Still a further object of the present invention is the provision of a digital counting/timing device of the type using an LSI chip which can be economically produced using MOS technology.

Yet another object of the present invention is the provision of a new digital counting/timing system which advantageously utilizes the capabilities of an LSI chip including several logic gates.

These and other objects and advantages will become apparent from the following description taken together with the accompanying drawings in which:

BRIEF DESCRIPTION OF THE DRAWINGS

FIG. 2 is a truth table for the input pulse divider circuit shown in FIG. 1;

FIGS. 3 and 4 are wave forms indicating the output condition for two separate modes of operation of the preferred embodiment of the invention;

GENERAL DESCRIPTION OF THE DIGITAL COUNTING DEVICE

Figure 1:
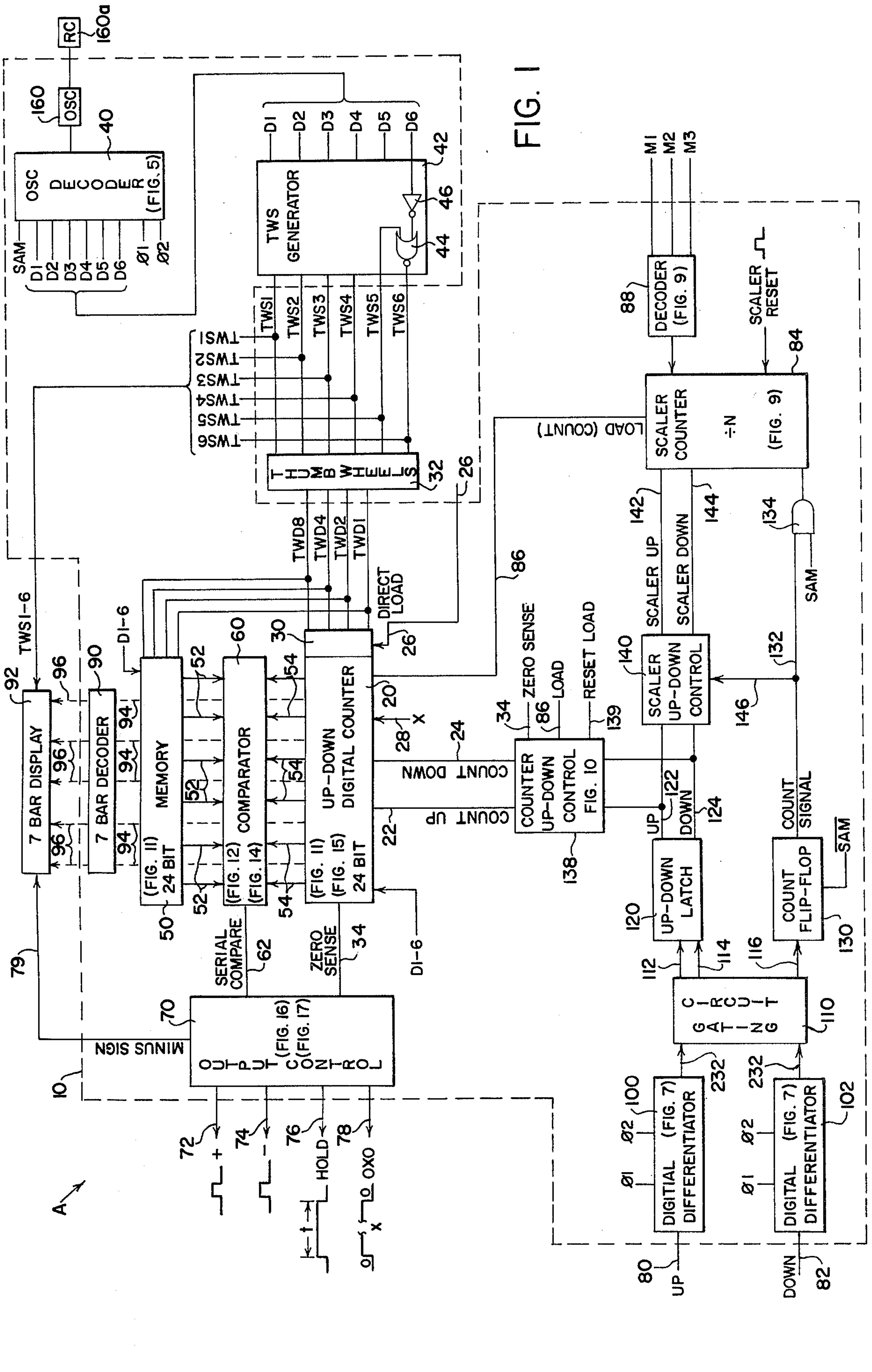
FIG. 1 is a schematic block circuit diagram illustrating certain components and their arrangements in the preferred embodiment of the present invention.

Referring now to the drawings wherein the showings are for the purpose of illustrating the preferred embodiment of the invention only, and not for the purpose of limiting same, FIG. 1 shows, somewhat schematically, a digital counting device A which utilizes a LSI chip 10 designated by the dashed lines. The components within the dashed lines are produced on the chip in accordance with standard MOS-FET technology. The chip 10 includes circuitry for processing six digits which can be loaded either directly into the six digit, 24 bit counter 20 or a six digit, 24 bit memory circuit 50. The digits are selected externally of chip 10 by an appropriate coding arrangement, such as thumbwheel networks, schematically represented as block 32. Chip 10 includes two primary outputs labeled + and −. The + output changes state and creates a signal when the counter counts down and reaches the memory number when in the $\overline{\text{LOAD DIRECT}}$ mode or reaches zero when in the LOAD DIRECT mode. The − output changes state and creates a signal when the counter reaches a set number loaded into the memory circuit. Each of the two primary outputs can be held for a selected time, such as 50 ms when the HOLD output is energized. There are two separate inputs to the chip 10. One input is labeled UP and is used for up counting. The second input is labeled DOWN and is for down counting. Each of these inputs is directed through a divider network or scaler counter 84 which can be programmed so that the internal counting is a multiple of input pulses directed to the chip on the two input terminals. When either of the inputs is connected to a known frequency such as 120 cps, the counter operates as a timer and the divider network or scaler counter determines the range of the timing cycle. There is included within chip 10 digital differentiators 100, 102 and a gating circuit 110 which prevent counting when pulses are applied simultaneously to the two input terminals of chip 10. In addition, these differentiators and the gating circuit determine the terminal on which an input pulse is received so that the counter in chip 10 functions in accordance with the mode indicated by the input terminal being used. These circuits and their functions will be described later in more detail.

The 24 bit binary up/down counter 20 can accommodate six digits each including four binary stages. Of course, various changes could be made in the number of digits and bits. Binary counter 20 includes four sections or stages for each digit. Each digit is loaded into the counter as a binary coded digit in accordance with normal counting practices. Line 22, the COUNT UP line, causes the counter to count in the up mode when a signal is applied to line 22. In a like manner, a signal applied to the COUNT DOWN line 24 causes counter 20 to count down. Combined up and down counters are quite well known in the LSI chip field and take a variety of different constructions. The particular details of the counter are not important to the present invention. Essentially, when counting, counter 20 decrements or increments one four stage digit section. When counting up, when a stage reaches digit nine, it rolls over to digit zero and increments the next significant digit. When counting down, the reverse takes place. When the least significant digit reaches zero, it rolls over to nine and decrements the next most significant digit. This function is well known in the binary counting technology. Control line 26, designated the DIRECT LOAD line, allows loading of counter 20 when a given logic is applied to this line. When opposite logic, designated as $\overline{\text{DIRECT LOAD}}$, is applied to this line, loading of the counter itself is inhibited. In accordance with the preferred embodiment of the invention, line 28 is designated as the X line. This causes a divide by six function at digits three and five from the most significant end of the six digit binary counter 20. Consequently, line 28 allows counting in minutes and seconds in accordance with the logic on this line. Again, the use of this type of control line for a counter is well known in the counting technology and does not form an essential part of the present invention. Line 28 is illustrated only for the purpose of completing the description of the preferred embodiment.

Figure 5:
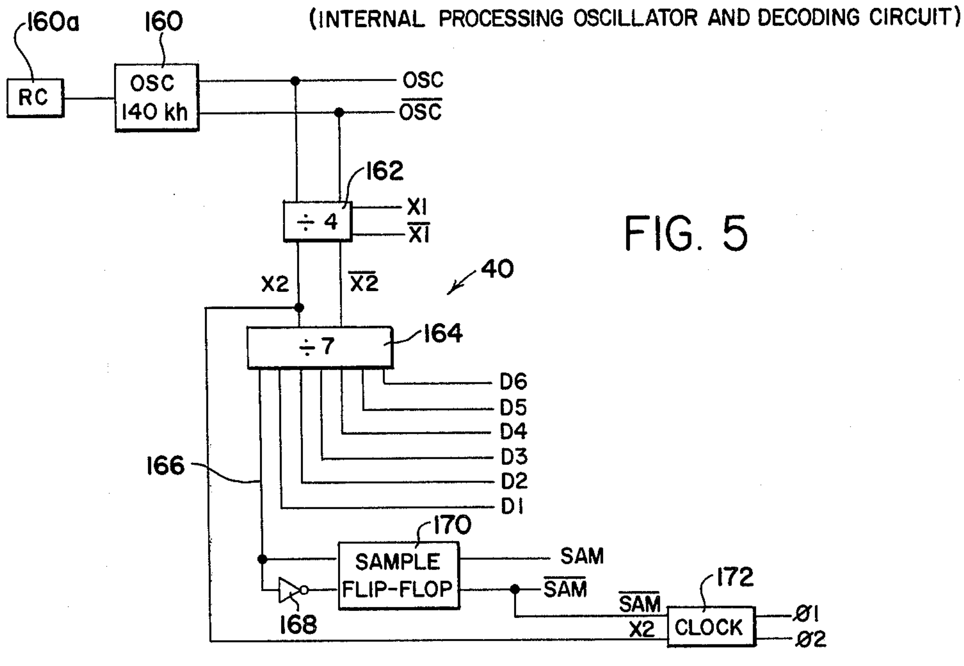
FIG. 5 is a block diagram illustrating the internal processing oscillator and decoder employed in the preferred embodiment of the invention.

When loading the six digits into binary counter 20, multiplexing lines D1–D6 are created in series by an oscillator and decoder 40, best shown in FIG. 5. As will be explained later, a number is loaded into counter 20 only when device A is being operated in the DIRECT LOAD mode, i.e. when the counting device is to count down from a number to zero. In this mode, when multiplexing pulse D1 appears, the binary logic on four binary coded decimal lines designated TWD8, TWD4, TWD2 and TWD1 is loaded into the first of the four bit digit stages of counter 20. When a D2 multiplexing pulse is created, after a D1 pulse, new binary coded decimal logic appears on the TWD lines. This new logic represents a second digit and is loaded into the second light digit stage of counter 20. This is repeated until all of the multiplexing pulses D1–D6 have been created and have loaded the corresponding binary coded decomal information from the TWD lines into the respective six stages of counter 20. Each of the multiplexing lines D1–D6 opens one of the four bit binary digit stages of counter 20 for reception of multiplexed information appearing on the TWD lines in a manner to be described later. The TWD lines are gated through the DIRECT LOAD gate 30 included as part of the counter circuitry and controlled by logic on DIRECT LOAD line 26. When gate 30 is open, loading of counter 20 can take place. When the logic on line 26 closes this gate, the information on the TWD lines cannot pass into the counter.

The logic on the TWS lines is created for multiplexing. A series of thumbwheels, shown as a schematically represented thrumwheel device 32 in FIG. 1, are each adjusted to provide a particular four bit binary coded network for each of the six digits. Six manually adjusted thumbwheels are used in device 32. When one of the multiplexing lines D1–D6 appears, it creates a corresponding TWS pulse which is directed to one of the six binary coded thumbwheel networks in thumbwheel device 32. Each TWS pulse produces a particular binary coded digit set into one stage of device 32 by manually moving the various thumbwheels in accordance with known practice. The binary coded decimal set into each stage of thumbwheel device 32 is directed simultaneously to the four TWD lines, TWD8, TWD4, TWD2, and TWD1. The information on the TWD lines is introduced through the DIRECT LOAD gate 30 into counter 20. It is seen that separate digits are loaded into separate locations in counter 20 under the control of one of the multiplexing lines D1–D6. The output of counter 20 is a ZERO SENSE line 34. A signal appears in this line when the counter 20 has been counted to zero in all six digit stages.

The multiplexing pulses on lines D1–D6 are created by the multiplex decoder 40 shown schematically in FIG. 1 and in ore detail in FIG. 5. Multiplexing lines D1–D6 are connected to a TWS generator 42, to create pulses on the thumbwheel selector lines TWS 1–6. Essentially, a pulse on one of the multiplexing lines D1–D6 creates a corresponding pulse on one of the TWS lines. To assure that there is no overlapping between adjacent pulses on the TWS lines, generator 42 includes a NOR gate 44 for each TWS line. Gate 44 has a first input connected to one of the multiplexing lines D1–6 through an inverter 46. The other input to gate 44 is connected to the next adjacent TWS line. Consequently, in order to develop a signal in a subsequent TWS line, such as TWS-6 as represented in block 42 of FIG. 1, the signal on the previous TWS line, i.e. TWS-5, must be zero at the same time that a multiplexing pulse is received on line D6. In this manner, one TWS line must become inactive before the next TWS line can become active. The adjacent multiplexing pulses which appear in lines D1–D6 are not spaced from each other. Consequently, the interconnecting gate arrangement schematically illustrated in FIG. 1 is one scheme to assure that concurrent TWS pulses are not created. A gate 44 is not required for TWS-1 since D1 does not follow immediately after D6.

This description of the multiplexing line D1–6, the thumbwheel selector lines TWS 1–6, and the thumbwheel decoder lines TWD 8–1 show how these lines are coordinated to multiplex digits into counter 20. The same basic system is used for multiplexing digits set in thumbwheel device 32 into a 24 bit read/write memory circuit 50. In accordance with the preferred embodiment of the invention, the thumbwheel decoder lines TWD 8–1 are directed to the memory circuit 50 and are multiplexed into the various digits by the multiplex lines D1–D6. Of course, as will be explained later in connection with FIG. 11, the multiplexing of the thumbwheel setting of device 32 into the memory circuit 50 and/or the counter 20 is controlled by a gate, i.e. gate 352, which is operated only at the start of a counting cycle.

During the counting cycle, lines 52 which read the binary information set into memory circuit 50 and lines 54 which read the binary information in counter 20 are both directed to a compare circuit 60. When the counter 20 is counted up to the setting of memory circuit 50, compare circuit 60 creates a SERIAL COMPARE signal in line 62.

The ZERO SENSE line 34 and the SERIAL COMPARE line 62 are connected to an output control 70 having four outputs 72, 74, 76 and 78. Output 72 is referred to as the + output. Line 74 is the − output. Line 76 is the HOLD output and line 78 is the OXO output. A last output is line 79 which controls the minus sign of the visual display unit 92. The operation of the outputs 72–78, in accordance with the preferred embodiment of the invqn tion, is shown in FIGS. 3 and 4 and will be described later.

Figure 9:
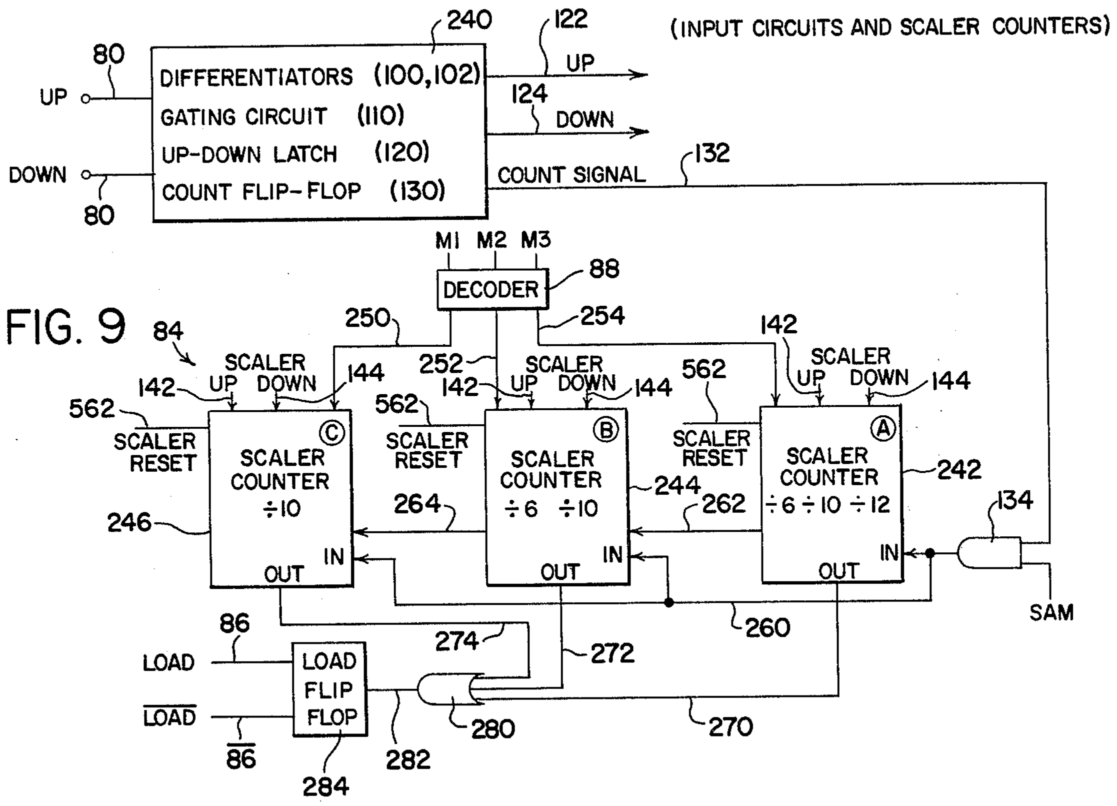
FIG. 9 is a block diagram illustrating the input circuit and scaler counters used in dividing the input pulses for use in the preferred embodiment of the present invention.

LSI chip 10 includes two terminals forming pulse input lines 80, 82. Line 80 is the UP input, and line 82 is the DOWN input. Input pulses on either of the inputs are directed through certain input circuitry shown in FIG. 1 and described later. The pulses are divided by a pulse divider or scaler counter 84, which is controlled by the logic on code lines M1, M2, M3 and is best shown in FIG. 9. An output pulse is created by scaler counter 84 after a given number of input pulses. This pulse is developed in the LOAD or COUNT line 86. The logic of the coded lines M1, $M_2$, M3, which can be manually changed to change the counting range, is decoded by a standard binary decoder 88 best shown in FIG. 9.

Figure 11:
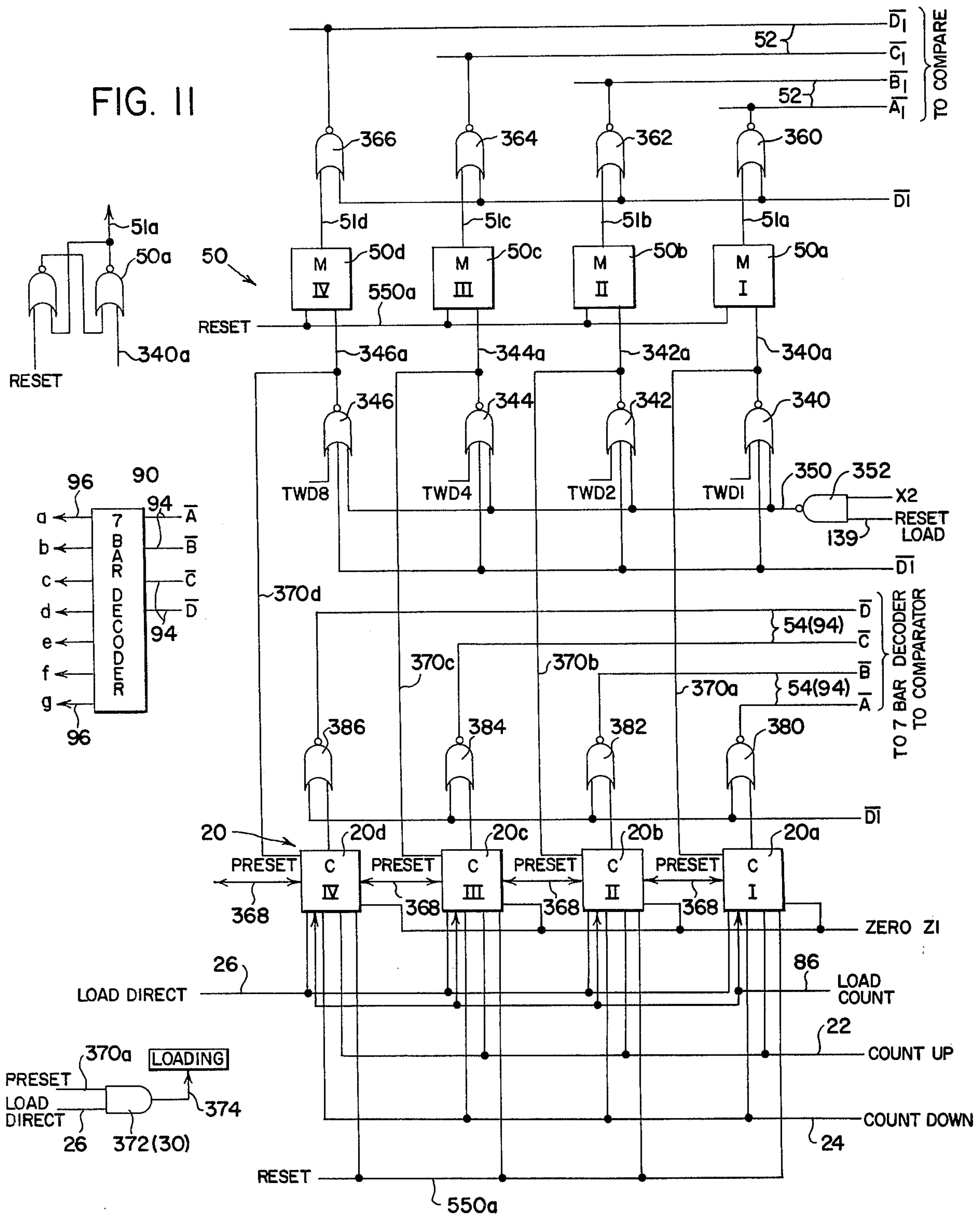
FIG. 11 is a logic wiring diagram illustrating the memory and counter circuit for a single digit and also the compare and display outputs for use in the preferred embodiment of the present invention.

The condition of counter 20 at any given time is directed to a 7-Bar decoder 90 which receives the binary coded decimal for each digit in counter 20 by the operation multiplex lines D1–D6 as best shown in FIG. 11. Decoder 90 controls the 7-Bar visual display 92. The input lines to the decoder are labeled 94 and the output lines connected to display 92 are labeled 96. The 7-Bar display is controlled by the TWS lines 1–6 to coordinate the stages of the display device with the stages of counter 20 being interrogated serially by multiplexing lines D1–6.

Referring now more particularly to the input circuits for the digital counting device A, as shown in FIG. 1. The UP input 80 is connected to a digital differentiator 100 and the DOWN input 82 is connected to digital differentiator 102. These differentiators are best shown in FIG. 7 and are controlled by clocking pulses 01, 02 created by the decoder 40 shown in FIG. 5. These clocking pulses advance the signals on the input lines 80, 82 into the input of a gating circuit 110. The first input signal appearing on one of the input lines is started in its gating progress through the differentiator. The next input signal, if on another of the inputs, then progresses behind the first signal to the gating circuit 110 which includes outputs 112, 114 and 116. Outputs 112, 114 carry logic which indicates whether the input signal being accepted by gating circuit 110 is from the UP input 80 or the DOWN input 82. The logic on lines 112, 114 is then used to control an UP-DOWN latch 120 which can be a somewhat standard flip-flop. If the input signal is on the UP line 80, latch 120 activates UP line 122. If the input signal is on DOWN line 82, latch 120 activates DOWN line 124. If two input signals are progressed through the differentiators 100, 102, at the same time, output 116 resets a COUNT flip-flop 130 to a zero output on COUNT SIGNAL line 132. Simultaneous signals on both the UP line 80 and DOWN line 82 are progressed through the differentiators 100, 102 at the same time by clocking pulses 01, 02. This condition prevents a COUNT SIGNAL in line 132. When either an up signal or a down signal is progressed through the respective differentiators, the UP-DOWN latch 120 is set in accordance with the particular signal and COUNT flip-flop 130 is toggled to a logic on line 132 indicating that a count is to be made at scaler counter 84. For the purpose of making the actual count, an AND gate 134 is controlled by the SAM line. This line is an operating or processing strobe which has a width similar to the width of the multiplex lines D1–6 and occurs between D6 and D1. Generation of the SAM signal on the SAM line will be described in connection with the showings of FIGS. 5 and 6. UP line 122 and DOWN line 124 are directed to the counter up-down control 138, shown in more detail in FIG. 10. This counter control is operated in response to the logic on UP line 122 and DOWN line 124, together with certain other signals, such as the logic on the ZERO SENSE line 34, logic on LOAD or COUNT line 86 and the logic on RESET LOAD line 139 created by the circuit illustrated in FIG. 19. The outputs of circuit 138 are the COUNT UP and COUNT DOWN lines 22, 24, respectively. The scaler up-down control 140 produces a SCALER UP output on line 142 and a SCALER DOWN output on line 144. These are outputs directed to the scaler 84 to determine whether or not the scaler counter should count up or down in accordance with the count signal received upon line 132 through gate 134. In this manner, the scaler is capable of counting up and counting down as well as dividing the pulses on line 132 by a number set by the code on lines M1, M2 and M3. As an example, assume that the scaler counter 84 is set to divide by 10 and it receives nine up signals from line 80. There has been no load or count signal created in line 86. Assume now, that five input signals are received on the DOWN input line 82. If the scaler counter 84 were not adjusted to count both up and down, the incoming pulses on the DOWN input line 82 would trigger a load signal in line 86. By allowing the scaler counter to count down, the five incoming pulses on the down input line 82 are subtracted from the previously received input nine pulses to produce a residual count of four in scaler counter 84. Consequently, the scaler counter is capable of totalizing in both directions while dividing by a selected number. The output of scaler up-down control 140 is synchronized with the particular incoming signal by an appropriate means represented by synchronizing line 146.

GENERAL OPERATION OF THE DIGITAL COUNTING DEVICE

As mentioned briefly in connection with the showings of FIG. 1, the digital counting device A can be operated in two modes. For the purposes of the discussion, the first mode is designated DIRECT LOAD and the second mode is $\overline{\text{DIRECT LOAD}}$. The logic on line 26 determines which of these modes has been selected. In accordance with DIRECT LOAD operation, gate 30 allows loading of a digit selected by thumbwheel device 32 into the up-down counter 20. This occurs at the start of the counting cycle which is initiated by a circuit to be described later. In this manner, the binary coded decimal number set by the thumbwheels in thumbwheel device 32 is loaded directly into the various stages of counter 20. Under the usual circumstances, in the DIRECT LOAD mode, input pulses are directed to the DOWN input 82. Pulses will pass through digit differentiator 102 to gating circuit 110. Since only down pulses are received, outputs 112, 114 will toggle the up-down latch 120 to indicate a down counting operation. This will be directed through lines 122, 124 to the counter up-down control 138 so that the line 24 is initially energized to indicate that upon receipt of a count or load in line 86, counter 20 will decrement. Lines 122, 124 also actuate scaler up-down control 140 to set a proper logic in lines 142, 144 so that the scaler counter 84 counts down. Pulses received by the gating circuit 110 also toggle the flip-flop 130 upon receipt of each pulse. This places a count signal in line 132 and at the input of gate 134. Upon the appearance of the next SAM pulse, an incoming pulse on line 132 is gated into scaler counter 84. When the SAM pulse disappears $\overline{\text{SAM}}$ toggles the count flip-flop 130 back to a condition for receiving a subsequent pulse. The SAM appears quite rapidly and is created by the internal oscillator which also creates the multiplexing pulses on lines D1–6. Consequently, in intended operation, a SAM pulse occurs several times when a single input counting pulse has been received. This type of processing with rapid internal strobing and multiplexing pulses is somewhat standard in counters of this type. By producing internal multiplexing and operating or processing pulses occurring quite rapidly, the counter, in essence, appears to be steady state and awaiting the next count. However, it is only necessary to provide a single SAM pulse for each incoming counting pulse when counting at higher rates.

Lines M1, M2 and M3 are set in accordance with the code shown in the truth table of FIG. 2. The code on these lines determines the number by which scaler counter 84 divides the incoming pulses from gate 134. Lines M1, M2 and M3 operate the same whether scaler counter 84 is counting up or down. The first three modes relate to timing operations wherein the scale is read in hundredths of a second, tenths of a second, and seconds, respectively. When reading in seconds, the X line directed to the counter line 28 in FIG. 1 is activated. This allows the counter to be set and operated in a mode developing seconds, minutes and hours across the counter. When the division by scaler counter is coded as 1, each incoming pulse produces a count in line 86. This operation is used when the digital counting device a is to be used as a counter. Each pulse is counted by the binary counter 20. When the division number to be used in the scaler counter 84 is 72, the counter functions in hundredths of a minute. In other words, each 72 pulses produces a single pulse in counter 20 for decrementing or incrementing the counts. As so far described, when dividing by a number, the incoming pulses or signals are a controlled 120 pps which can be obtained by standard line current. If the digital counting device A is to be used on 50 cycle line current operation, the next two modes of FIG. 2 are employed. At 50 cycles, the divide by 1 mode is also used for hundredths of a second. When dividing by 10, the counter reads in tenths of a second. When dividing by 100, the scale reads in seconds. Again, this activates the X line 28 to read in seconds, minutes and hours. When dividing by 1,000, i.e. that last mode shown in FIG. 2, a special situation is created. Kilo counts are recorded in the counter. Each 1,000 counts, clocked or otherwise, produces one count in counter 20.

Proceeding with the description of operation when the counter device A is operating in the DIRECT LOAD operation mode, pulses on DOWN input 82 continue to count down at a rate determined by the setting of decoder 88. During this time, the memory circuit 50 is not operative, since the counting is away from any number set into the memory. When the counter 20 counts down to zero, a signal is created in ZERO SENSE line 34 which activates the output control 70. The output operation is shown in FIG. 3. The + output 72 remains a logic 0 until ZERO SENSE occurs. At that time, the + output immediately shifts to a logic 1. The − output 74 remains at a logic 1 at ZERO SENSE. The HOLD output 76 shifts a logic 1 at ZERO SENSE to produce a logic 1 pulse having a time *t* which can be adjusted. In the preferred embodiment, time *t* is about 50 ms. The OXO output is a logic 0 at reset which occurs at the start of the counting cycle. Thereafter, it remains at logic 1 which is the X condition, until the ZERO SENSE signal is received. Thereafter, the output on line 78 shifts back to a logic 0. All of these wave shapes are clearly shown in FIG. 3.

In accordance with the present invention, and by use of controls which will be explained later, the digital counting device A can continue to count after a ZERO SENSE pulse. When this operation is selected, a minus sign signal is created in line 79 at the ZERO SENSE condition. Thereafter, control 138 activates line 22 indicating to the counter 20 that it should commence counting up when receiving counts for the DOWN input 82. This prevents the counter from rolling over all of its digits to nines upon receipt of the next pulse in input 82, after a ZERO SENSE. The continued counting operation is shown in FIG. 3. The − output shifts to a logic 0. Consequently, a logic 1 on the + output and a logic 0 on the − output indicates that the counter is counting in the negative mode. This concludes the general discussion of the operation of digital counting device A in the DIRECT LOAD mode with incoming down counts.

The next basic operating mode is the $\overline{\text{DIRECT LOAD}}$ mode wherein the logic on line 26 prevents loading of the thumbwheel decoding lines TWD1–6 into counter 20. At the start of the cycle, a reset signal clears counter 20 and the memory circuit 50. Thereafter, the information from the thumbwheel device 32 is multiplexed into the memory 50 by serial insertion from the TWS lines. No information from the TWD lines is loaded into counter 20 since line 26 blocks gate 30. Consequently, the thumbwheel settings of device 32 are loaded into only memory circuit 50. The counter is reset to zero. Thereafter, the input pulses are directed to the input by the UP input line 80. The input pulses pass through a digital differentiator 100 to control the gating circuit 110. The up-down latch 120 actuates lines 122, 124 to indicate that the up counting mode is being used. This causes control 138 to actuate COUNT UP line 22. In this same manner, the scaler counter 84 is controlled by lines 142, 144 to count in the up direction. As the input pulses continue, they are directed through count flip-flop 130 to gate 134 by line 132. This causes up counting of counter 20 upon the appearance of each pulse in the LOAD or COUNT line 86. When the memory circuit logic being read by lines 52 matches the counter logic being read by lines 54, comparator 60 is energized to produce a SERIAL COMPARE signal in line 62. This, like the ZERO SENSE signal, actuates the output control 70. A down count on line 82 can be accepted in this mode to reduce the total on counter 20.

The operation of the output control in the $\overline{\text{DIRECT LOAD}}$ mode is set forth in FIG. 4. When there is a SERIAL COMPARE signal, the + output is at a logic 1 and the negative output shifts to a logic 1. Consequently, two logic 1 indicates a SERIAL COMPARE similar to the way a logic 1 on both the + and – outputs indicates a ZERO SENSE in the DIRECT LOAD mode of operation. The difference being that the two outputs 72, 74 have reversed logic after being reset and during the up counting operation. The OXO output 78 is controlled in a manner similar to the DIRECT LOAD operation. Also, the HOLD output 76 is held in the same manner as in the prior type of operation. If the up counting continues, and this is allowed by the starting operation selected in accordance with the system to be explained later, the + output shifts to a logic 0 and remains. The – output which has shifted to a logic 1, remains at a logic 1. Consequently, the digital counting device produces a signal when there is a SERIAL COMPARE signal and is capable of continuing counting if this type of operation is desired.

In either mode of operation, the apparatus A can have a cycle which is concluded by either the ZERO SENSE signal or the SERIAL COMPARE signal. In addition, these signals can cause the memory circuit and counter to be reloaded and repeat the timing cycle. As a third alternative, they can continue to count as explained in the previous paragraphs. If the incoming counts are clocking pulse, such as a fixed 120 pps or 100 pps, device A functions as a timer. If the pulses are random, it functions as a counter.

The two modes of operation explained above are the primary modes; however, digital counting device A can be uses as a totalizer. By receiving pulses in both the up line 80, and the down line 82, device A can record the absolute number of pulses by adding pulses from line 80 and subtracting pulses from line 82. Since scaler counter 84 can operate both up and down, this totalizing function can be used with various settings of the scaler counter. However, generally the scaler counter, when totalizing, would be set to a divide by one code.

INTERNAL PROCESSING OSCILLATOR AND DECODING CIRCUIT

Figure 6:
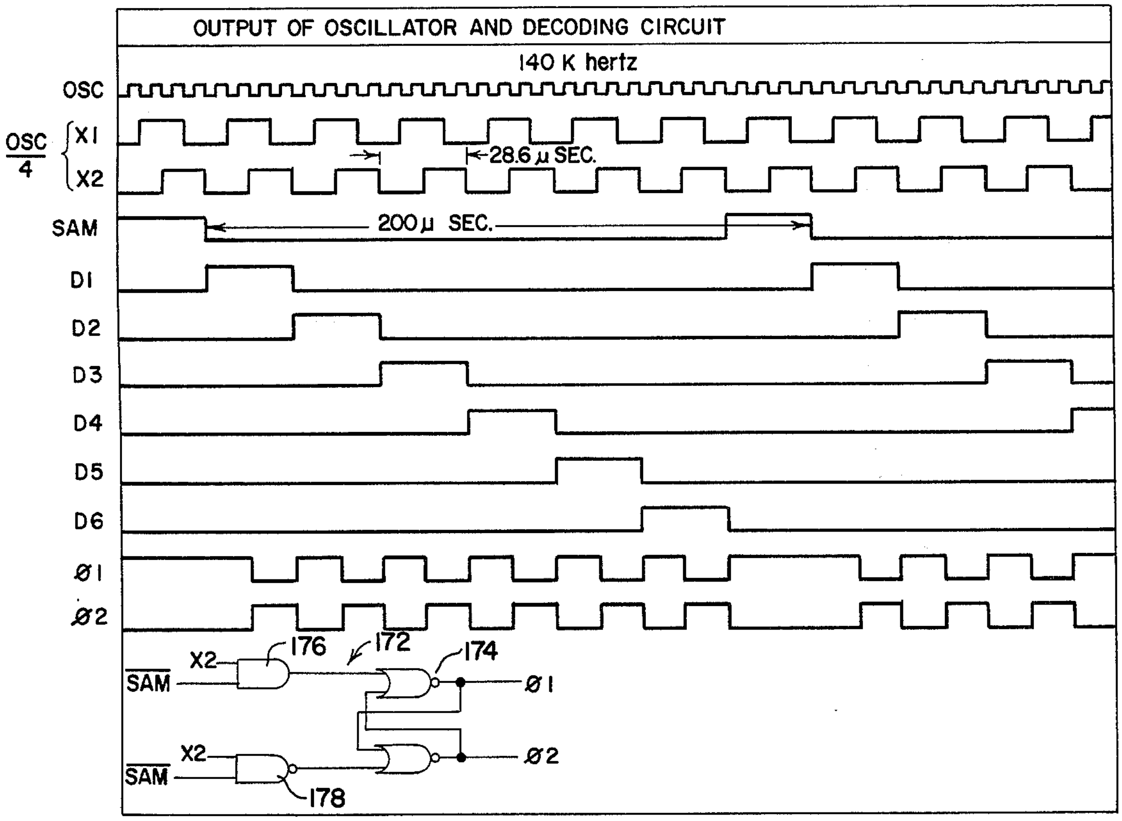
FIG. 6 is a wave shaped chart illustrating the relationship of the various wave shapes created by the circuit shown in FIG. 5 and a simplified view of the circuit for generating 01 and 02 clocking pulses.
Figures 7, 8:
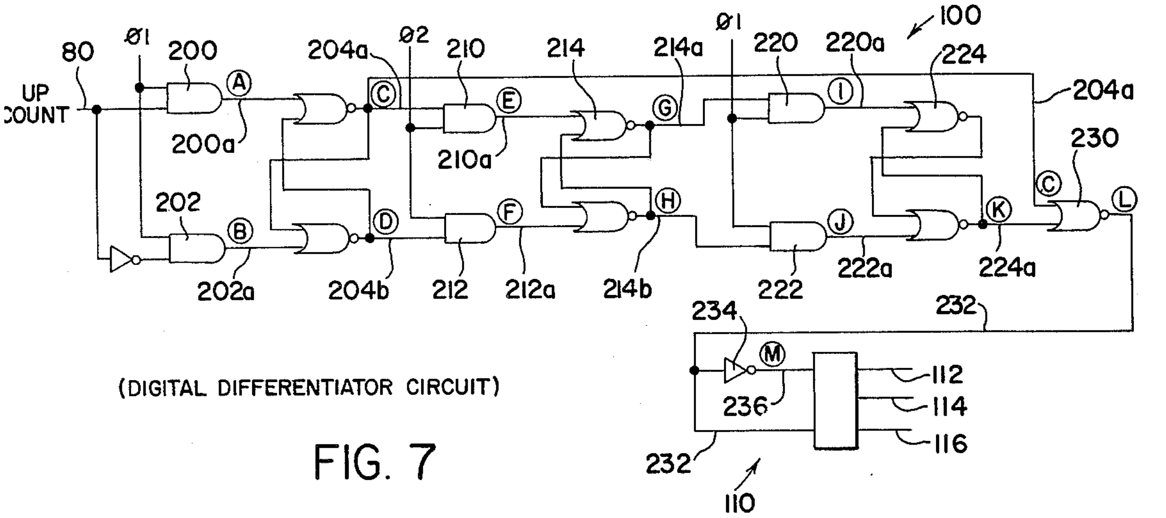
FIG. 7 is a logic diagram illustrating the digital differentiator circuit employed in the preferred embodiment of the present invention.
FIG. 8 is a truth table illustrating the operating characteristics of the logic diagram shown in FIG. 7.

Referring now more particularly to FIGS. 5 and 6, the multiplex decoder 40 is shown as a part of the total internal processing oscillator and decoder circuit. This circuit includes an oscillator 160 controlled by an external RC circuit 160a to oscillate at a selected frequency, which in the preferred embodiment of the invention is 140 kilohertz. The outputs of oscillator 160 are lines OSC and $\overline{\text{OSC}}$. Oscillator lines OSC, $\overline{\text{OSC}}$ control a divide-by-4 divider circuit 162 which produces output pulses on lines X1, $\overline{\text{X1}}$ and X2, $\overline{\text{X2}}$. The pulsing lines X2, $\overline{\text{X2}}$ are directed to a divide-by-7 counter circuit 164 having seven outputs, the first being line 166. The remaining output lines are the multiplexing lines D1–6 which receive successive multiplexing pulses. Line 166 includes an inverter 168 so that the inverted and non-inverted logic on this line can be directed to a SAMPLE flip-flop 170 for producing logic 1 pulses successively in the SAM and $\overline{\text{SAM}}$ lines. $\overline{\text{SAM}}$ and X2 control a clocking circuit 172 having output clocking pulses 01, 02. This clocking circuit can include a varity of designs; however, one design is illustrated in the lower portion of FIG. 6. This representative logic circuit includes a flip-flop 174 controlled by AND gate 176 and NAND gate 178. These two gates receive X2 and $\overline{\text{SAM}}$ signals to control the output lines 01, 02.

The wave shapes created by the circuit in FIG. 5 are illustrated in FIG. 6. Oscillator lines OSC, $\overline{\text{OSC}}$ are oscillating at a frequency of 140 kilohertz; therefore, the X1, X2 pulses have a frequency of one-fourth of that amount and occur each 28.6 $\mu$ s. The output of divide-by-7 circuit 164 produces seven separate and distinct pulses, each of which occur once each 200 $\mu$ s. The chart of FIG. 6 shows that after a SAM pulse is received, the D1–D6 multiplexing pulses occur in succession. The lower two graphs illustrate the 01, 02 clocking pulses created by the clocking circuit 172 shown in FIG. 6. These pulses occur internally of chip 10 and are quite rapid. During the SAM pulse, most logic functions of the digital counting device A are performed. During the subsequent multiplexing pulses, various multiplexing functions are performed. As can be seen in FIG. 6, all functions are performed within about 200 $\mu$ s. When device A is used for timing, a 120 pps input at either terminals 80, 82 will produce a pulse approximately each 8.33 ms. Thus, the internal processing is completed and awaiting a new pulse a majority of the time. Consequently, many cycles of the circuit shown in FIG. 5 occur during and between each incoming pulse. When counting is being accomplished by the digital counting device A, the pulses are usually more random. Obviously, they do not approach the rapidity of the internal oscillating circuits. For this reason, the internal circuits are stabilized between input pulses by a series of separate cycles of the internal processing oscillator and decoder circuit shown in FIG. 5 and having the wave shapes disclosed in FIG. 6.

DIGITAL DIFFERENTIATOR CIRCUITS

Referring now to FIGS. 7 and 8, one of the digital differentiator circuits 100, 102, as shown in FIG. 1, is illustrated in more detail together with a truth table of the operating characteristics for the digital differentiator. A description of the illustrated circuit applies equally to both differentiator circuits. AND gates 200, 202 are controlled by 01 and an input signal on UP input line 80. The outputs 200*a*, 202*a*, of these gates are directed to the inputs of a first flip-flop 204 which has outputs 204*a*, 204*b* connected to the input side of AND gates 210, 212, respectively. These AND gates are controlled by 02 and have outputs 210*a*, 212*a* directed to the inputs of a second flip-flop 214. This second flip-flop has outputs 214*a*, 214*b* directed to the input of two AND gates 220, 222 and controlled by 01. Outputs 220*a*, 222*a* of the last mentioned AND gates are directed to the inputs of a third flip-flop 224 having an output 224*a* directed to the input of NOR gate 230. Consequently, the NOR gate 230 has an output 232 controlled by the logic on lines 204*a*, 224*a*. The output of the differentiator circuit on line 232 is directed to the gating circuit 110 shown in FIG. 1 which is shown in simplified form in FIG. 7. The input side of the gating circuit 110 includes inverter 234 which produces an inverted output 236. The output 232, 236 from both differentiator circuits 100, 102 control the logic on lines 112, 114 directed to the up-down latch 120 shown in FIG. 1 and the logic on line 116 which controls the count flip-flop 130.

To understand the operation of the differentiators 100, 102 the various lines of the circuit are labeled A-M and the logic of these various points is set forth in the truth table of FIG. 8 under different operating conditions listed at the left of the truth table. From this truth table, it is noted that when there is no input signal on the up input line 80, the output L of the differentiator circuit is a logic 0. When a pulse is received on input line 80, point L shifts to a logic 1 during the next 01, 02. Thereafter, the next 01 again shifts the output logic at point L to a logic 0. This indicates that a count has progressed through the differentiator circuit from input to output. The toggling of point L between a logic 1 and a logic 0 produces an up pulse in lines 112, 114 of gating circuit 110. Thus, whenever a pulse is received, point L shifts to a logic 1 for the time required to create 01, 02 and then triggers the output by the next 01 pulse. If there is a signal or pulse on both the up input 80 and the down input 82 which signals are adjacent but not simultaneous, toggling of the two circuits will occur at different time intervals. If the two inputs remain energized at the same time, subsequent operations of the differentiator circuits by 01, 02 will produce a cancelling effect at gate 110. Consequently, if there are two inputs at any given time, the line 116 is not energized to produce a count within the device. In this manner, only separate and distinct signals or pulses on one of the input lines 80, 82 will actually energize the count flip-flop 130 and allow counting of the counter 20 through the scaler counter 84. Circuits 100, 102 produce a cancelling effect on line 116 with simultaneous up and down pulses and will toggle the lines 112, 114 only when the particular one of the output lines 232 shifts logic without the other line 232 shifting logic.

INPUT CIRCUIT AND SCALER COUNTERS

Referring now to FIG. 9, certain input circuits and the scaler counters are illustrated schematically. Combined circuit 240 includes the differentiators 100, 102, gating circuit 110, up-down latch 120 and count flip-flop 130, as shown in FIG. 1. The output on line 132 is directed to the input gate 134 which is controlled by a SAM pulse. When there is a count signal and a SAM pulse, a pulse is applied by gate 134 to the three stages 242, 244, and 246 of the scaler counters which are designated stages A, B, and C, respectively. The operating characteristics of the three separate stages is controlled by the logic on lines 250, 252 and 254 from decoder 88 for decoding the logic on terminals or lines M1, M2 and M3 externally of chip 10. The inputs are directed to the various stages by an appropriate means represented as line 260. Carryover from one counting stage to the other is accomplished in accordance with normal binary counting technology and is represented by carryover lines 262, 264. When the code for the divide by 5/6 mode, as shown in FIG. 2, is applied to lines M1, M2 and M3, stage A of scaler counter 84 is activated in the divide by 6 mode. In this particular situation, a pulse is produced upon each incoming pulse except for the sixth pulse. At that time, no output pulse is created in output line 270. The other output lines 272, 274 are combined with output line 270 to control OR gate 280 having an output 282 directed toward a load flip-flop 284 which controls the logic on the LOAD, $\overline{\text{LOAD}}$ lines 86 and $\overline{\mathbf{86}}$. When the code on lines M1, M2 and M3 is used for producing a divide by twelve situation, only scaler counter stage A is employed and there is a signal after 12 inputing pulses are received from gate 134. When the divide by 120 situation is coded in lines M1, M2 and M3, the output 270 is not actuated and the counter stage A and B function through the carryover line 262. Stage A is set to a divide by twelve mode and stage B is set to a divide by 10 mode. Consequently, after each 120 pulses, a pulse appears in line 272. When divide by 1 mode is selected by lines M1, M2 and M3, pulses are directed through stage A to line 270 upon each incoming pulse from gate 134. When the divide by 72 mode is required, stages A and B are activated with stage A being selected at divide by twelve and stage B selected at divide by 6. Consequently, the output is received in line 272 after each 72 pulses from gate 134. The divide by 10 mode is accomplished by activating stage A in the divide by 10 mode. After 10 pulses, a pulse appears in output line 270 to actuate OR gate 280. In a similar manner, when a divide by 100 mode is required, stages A and B are activated in the divide by 10 mode. Output 270 is not used and there is a carryover in line 262. Consequently, after every 100 pulses, line 272 is pulsed. When the divide by 1,000 mode is used, output lines 270, 272 are inactive and a carryover is accomplished through line 264 by using all three stages 242, 244 and 246. After 1,000 pulses, a pulse is created in line 274. The operation of the various stages is explanatory in nature and various up-down counters and combination of counters can be used to create the desired output pulse upon various required modes of operation. The modes set forth in FIG. 2, are only representative in nature and may be varied without departing from the intended spirit and scope of the present invention. The code on lines 142, 144 determined whether the scaler counter counts up or down upon receipt of the next count signal from gate 134.

COUNTER UP-DOWN CONTROL CIRCUIT

Figure 10:
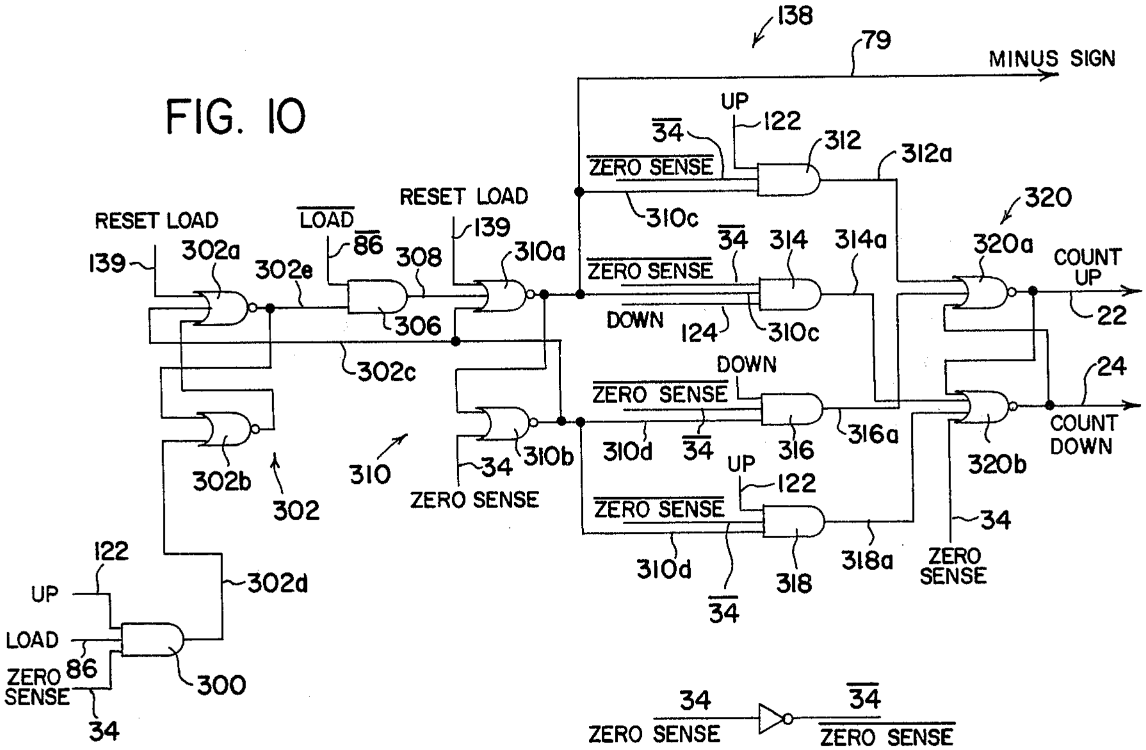
FIG. 10 is a logic diagram illustrating the counter up-down control circuit of the preferred embodiment of the present invention.

As explained in connection with the showings of FIG. 1, a counter up-down control circuit 138 determines whether or not the digital binary counter 20 counts in an up direction or a down direction upon receipt of a COUNT or LOAD signal on line 86. A variety of circuits could be used for this function; however, in accordance with the preferred embodiment of the invention, the circuit illustrated in FIG. 10 is employed. This circuit includes an AND gate 300 controlled by UP line 122, LOAD line 86, and ZERO SENSE line 34. Gate 300 controls a flip-flop 302 including NOR gates 302*a*, 302*b*. Gate 302*a* includes a first input 302*c* and a second input 139 which is the RESET LOAD line. Gate 302*b* includes input 302*d* which is the output of gate 300. Output 302*e* of gate 302*a* is directed to an AND gate 306 controlled by the $\overline{\text{LOAD}}$ line. Output 308 of this gate is directed to a flip-flop 310 including NOR gates 310*a*, 310*b* having outputs 310*c*, 310*d*, respectively. The inputs of gate 310*a* are lines 139 (RESET LOAD) and line 308. The input of gate 310*d* is the ZERO SENSE line 34. Outputs 310*c*, 310*d* of flip-flop 310 control AND gates 312, 314, 316 and 318 having outputs 312*a*, 314*a*, 316*a* and 318*a*, respectively. Inputs to these four AND gates are clearly designated in FIG. 10. The outputs of these gates control an output flip-flop 320 including NOR gates 320*a*, 320*b*. The output of these respective gates are lines 22, 24, as illustrated and discussed in connection with FIG. 1. A signal on line 22 indicates that the counter 20 is to count up while a signal on line 24 indicates that the counter 20 is to count down. Flip-flop 320 can be set by a ZERO SENSE signal on line 34.

The operation of the circuit illustrated in FIG. 10 can best be understood by considering the two principal modes of operation of digital counting device A. Assuming that the counting device is operating in the DIRECT LOAD mode, a number is loaded into counter 20, and the counter is counted down until it reaches zero. At that time, there is a signal in ZERO SENSE line 34. In this mode, a signal is received in the DOWN input 82 during operation. This causes latch 120 to set UP line 122 to a logic 0 and DOWN line 124 to a logic 1. A logic 0 in the UP line disables AND gates 300, 312 and 318 of FIG. 10. At the start of operation, there is no ZERO SENSE signal; therefore, the logic on ZERO SENSE line 34 is logic 0 and the logic on $\overline{\text{ZERO SENSE}}$ lines $\overline{34}$ is a logic 1. This enables AND gates 314, 316. At the start of a counting cycle, a RESET LOAD pulse is created. This produces a logic 1 in line 139 so that output 302*e* is reset to a logic 0. At the same time, the output of gate 310*a* is reset to a logic 0. With a logic 0 appearing on both inputs of gate 310*b*, a logic 1 occurs in line 310*d*. This latches the gate 302*a* to a logic 0 output through lines 310*d* and 302*c*. Line 310*d* is at a logic 1. This activates AND gate 316 to produce a logic 1 in output 316*a*. This sets output 22 of gate 320*a* to a logic 0. Since all inputs to gate 320*b* are logic 0, line 24 is at a logic 1. With a logic 0 at line 22 and a logic 1 at line 24, counter 20 is instructed to count down when it receives a count pulse from the scaler counter 84 through line 86. If line 310*c* is at a logic 0, MINUS SIGN line 79 is a logic 0 and no minus sign is displayed by the 7-Bar display unit 92, as schematically illustrated in FIG. 1. During the counting cycle, line 86 alternates between a logic 1 and a logic 0; however, this has no effect upon the circuit since gates 300 and 306 are disabled by their other inputs being logic 0. Assume now that counter 20 reaches zero. This produces a logic 1 in ZERO SENSE line 34 to produce a logic 0 in output line 310*d* of gate 310*b*. Since output 310*d* is directed to the inputs of gate 310*a*, all zeros appear at the inputs of this gate. This produces a logic 1 in line 310*c*. However, all gates 312, 314, 316 and 318 are disabled by zero which is now appearing in $\overline{\text{ZERO SENSE}}$ line $\overline{34}$. Output lines 312*a*, 314*a* and 318*a* all have a logic 0 output. This releases flip-flop 320 so that the ZERO SENSE signal in line 34 at the input of gates 320*b* toggles flip-flop 320 to produce a logic 1 in line 22 and a logic 0 in line 24. In this condition, counter 20 is instructed to count up when a ZERO SENSE signal has been created. In addition, since flip-flop 310 has been set to a logic 1 in line 310*c*, a signal is created within MINUS SIGN line 79. Thus, assuming that there is no termination of the input pulses being counted and counter 20 is set for continuous operation after the ZERO SENSE signal, in a manner to be explained later, no RESET LOAD signal is received, and counter 20 continues to count up when receiving pulses on the down input line 82 after a ZERO SENSE signal. The reason for this is that after counter 20 reaches zero, the stages in counter 20 should not roll over to a series of nines which would occur with continued down counting of the counter. In this manner, counter 20 can continue to operate after the zero point; however, it reads in negative counts on display 92. Upon reaching the ZERO SENSE position, the outputs of device A are actuated in accordance with the chart shown in FIG. 3.

If the cycle in the DIRECT LOAD mode of operation is to be completed after zero is reached by counter 20, an internal RESET signal is created for blocking operation of counter 20 and the other circuits involved in the counting process.

If the cycle is to be completed and then repeated at once, a RESET LOAD signal is received in line 139 immediately after a ZERO SENSE signal. This prevents line 310*c* from going to a logic 1 to create a minus sign. Counter 20 is again reloaded with a number set in the thumbwheel device 32 and the down counting is repeated.

The next situation results when digital counting device A is operating in DIRECT LOAD mode of operation and is generally receiving input counts on the DOWN line 82. Assume that a signal is applied to the up input line 80. A logic 1 appears in line 122 to activate AND gate 318. A logic 1 appears in output 318*a* and toggles flip-flop 320 to produce a logic 1 in COUNT UP line 22. For this particular input signal, counter 20 will be condition to count up. Also, the scaler counter 84 will be controlled by lines 142, 144 to count up instead of the common down counting in the DIRECT LOAD mode. This happens generally when device A is counting instead of timing. Of course, if these down counts are not sufficient to cause pulsing of the scaler counter 84 to produce an actual count or load signal in line 86, the existence of an up count at input 80 will be remembered by the scaler counter. If the scaler counter is programmed for a divide by one mode, which is the most common counting mode, the totalization takes place in counter 20. This adding and subtracting would normally not be used when the digital counting device A is used for timing where a uniform pulse is applied to only the DOWN input line 82 during the DIRECT LOAD mode of operation.

Referring now to the DIRECT LOAD mode of operation, counter 20 is reset to zero and the thumbwheel information from device 32 is loaded into the memory circuit 50 at the start of a cycle. Gate 30, as shown in FIG. 1, prevents loading of the thumbwheel information into counter 20. Since there is a ZERO SENSE signal at the start, a logic 1 appears in line 34 at the input of gate 320*b*. This produces a logic 1 in line 22 and a logic 0 in line 24. The input in this mode of operation is applied to the UP input line 80; therefore, when the first LOAD pulse is received from the scaler counter 84 lines 34, 86 and 122 are all at a logic 1. This produces a logic 1 in the output 302*d* of AND gate 300. Consequently, flip-flop 302 is toggled to produce a logic 1 in output 302*e* of gate 302*a*. When the first COUNT or LOAD disappears from line 86, both inputs to gate 306 are a logic 1. This produces a logic 1 in line 308. This toggles flip-flop 310 from the condition caused by ZERO SENSE signal at the input of gate 310*b* to a condition with a logic 0 in line 310*c*. Since the ZERO SENSE disappears after the first LOAD signal has been counted by counter 20, a logic 1 appears on all inputs of gate 318. Consequently, a logic 1 appears in output 318*a* to hold the flip-flop 320 with a logic 1 in COUNT UP line 22. This operation continues during the DIRECT LOAD mode of operation.

Since the DIRECT LOAD mode of operation does not produce a ZERO SENSE signal, the system continues to count up until it is reset by an internal RESET signal at the end of a counting cycle which is generally when the counter 20 has counted up to the number loaded into memory circuit 50. During the timing function, a uniform pulsing signal is applied to UP input line 80. When counting or totalizing, it is possible to receive a signal from the DOWN input line 82. When this happens, gate 316 is activated and gate 318 is disabled. This toggles flip-flop 320 to place a logic 1 on the COUNT DOWN line 24. This down count is then remembered by the scaler counter. Of course, if in the counting mode, the scaler counter 84 is generally set to a divide by 1. In this instance, each pulse on the down input line 82 will cause counter 20 to count down by one digit in the least significant stage.

MEMORY-COUNTER CIRCUIT AND COMPARE DISPLAY OUTPUTS

Referring now to FIG. 11, a single digit, including four stages of the counter 20 and memory circuit 50, is schematically illustrated. As previously mentioned, six separate digits are contemplated in the preferred embodiment of the invention. Of course, various other numbers of digits can be used without departing from the intended spirit and scope of the present invention. Each of the digits, in accordance with somewhat standard binary practice, includes four separate and distinct stages each capable of handling a single bit of binary information. These four stages are labeled I, II, III and IV. Referring first to the memory stages, the four stages are labeled 50*a*, 50*b*, 50*c* and 50*d* and include an appropriate read-write memory circuit, such as a flip-flop, and output lines 51*a*, 51*b*, 51*c* and 51*d*, respectively. The logic on output lines 51*a–d* is a logic within the memory stages 50*a–d* at any given time. To place 4 bits of binary information within the memory stages shown in FIG. 11, there are provided input NOR gates 340, 342, 344 and 346 each of which is connected to one of the TWD lines. These gates have a common input connected to the $\overline{D1}$ line which is held to a logic 1 unit multiplexing pulse D1 appears. At that time, the $\overline{D1}$ line shifts to a logic 0 to enable gates 340–346. The other common input to the gates is line 350 which is the output of a NAND gate 352 having two inputs, one connected to the X2 line and the other connected to the RESET LOAD line 139. A RESET LOAD pulse on line 139 occurs when a number is to be loaded into memory circuit 50 or counter 20. When there is no pulse on line 139, gate 352 is latched to a logic 1 in line 350. This latches gates 340, 342, 344 and 346 to a logic 0 output in output lines 340*a*, 342*a*, 344*a*, and 346*a*, respectively. A logic 0 in these lines is incapable of toggling the flip-flops in memory circuits 50*a–d*, one of which is shown schematically at the left of FIG. 11. Before the start of each timing or counting cycle, a logic 1 appears in the RESET line. This sets the flip-flop to a logic 1 in lines 51*a–d*. After the RESET signal has disappeared, a RESET LOAD signal appears in line 139. While this signal is on line 139, an X2 pulse appears to produce a logic 0 in line 350. Gates 340–346 are now enabled for operation when the $\overline{D1}$ multiplexing pulse appears. If the TWD line of a stage includes a logic 0, a logic 1 appears at the output of the gate controlled by the TWD line. For instance, if TWD1 is a logic 0 during the loading operation for the first illustrated stage of memory circuit 50, a logic 1 appears in line 340*a* when there are X2, RESET LOAD, and D1 pulses. A logic 1 in line 340*a* produces a logic 0 in line 51*a*. This corresponds to the binary logic of a TWD1 line. If TWD1 line is at logic 1, output 340*a* would be a logic 0 and stage 50*a* would remain in the reset logic 1 condition and a logic 1 would appear at output line 51*a*. Consequently, the logic on the TWD line is transferred to the memory stages 50*a–d*. The same operation continues for the other five digits when a pulse occurs in the D2–D6 lines. The other multiplexing lines control similar single digit memory circuits. The logic on lines 51*a–d* is read by NOR gates 306–366 upon appearance of a D1 multiplexing pulse. This is a continuous reading process every time a D1 pulse appears. Each of the four stages in the six memory units is connected to the four compare lines 52, as shown in FIG. 11. By producing a series of multiplexing pulses D1–6 the four lines 52 serially read the logic on the separate and distinct digits. This logic appears in succession at lines 52 which are labeled $\overline{A_1}$, $\overline{B_1}$, $\overline{C_1}$ and $\overline{D_1}$. Since the D1–6 pulses appear quite rapidly, the digit sections of the memory circuit 50 are read in series at a rapid rate during the operation of counting device A.

Lines 340*a*–346*a* are connected to PRESET lines 370*a*–370*d* of counter stages 20*a–d*. The counter stages are shown as a Johnson counter with steering lines 368 interconnecting the stages to cause proper sequential counting upon receipt of successive pulses in LOAD or COUNT line 86. Lines 22, 24 determine whether the count is up or down in the illustrated stages. The other digit stages are interconnected to produce counting over the six digits. The adjacent digits operate in cascade, but a pulse on the X line 28 of FIG. 1 allows selected digits to cascade after the fifth count. When the TWD lines are read by the simultaneous occurrence of a D1 multiplexing pulse, a RESET LOAD pulse and X2 pulse, the logic of the TWD lines appears on the counter PRESET lines. Assuming that the digital counting device A is operating in a DIRECT LOAD mode, the logic of the TWD lines must be loaded into the counter stages 20*a–d*. Consequently, a logic 1 appears in DIRECT LOAD line 26 which is directed to an AND gate 372 (30) associated with each of the counter stages 20*a–d*. Only one of these gates is illustrated in FIG. 11; however, this type gating to allow loading of the counter stages 20*a–d* is apparent. The other input to AND gate 372 is a PRESET line, such as PRESET line 370*a* of stage I. A logic 1 on DIRECT LOAD line 26 allows loading of the logic on the PRESET line 370*a* into counter stage 20*a*, i.e. stage I. The logic 1 on line 26 appears simultaneously on the six separate sections of the counter 20. This logic is introduced from the exterior of chip 10. Each of the six digits is loaded when one of the multiplexing lines D1–6 appears with a logic 0 on line 350. If the digital counting device A is operated in the $\overline{\text{DIRECT LOAD}}$ mode, the number selected by the thumbwheel device 32 shown in FIG. 1, is loaded only into memory circuit 50. This is accomplished by a logic 0 in DIRECT LOAD line 26.

A RESET pulse at the start of the counting cycle resets each of the memory stages 20*a–d* of all digits to a logic 0. The gate 372 corresponds generally to the DIRECT LOAD gate 30 shown in FIG. 1; however, the particular gate shown in FIG. 11 is used in the preferred embodiment of the invention. COUNT UP and COUNT DOWN lines 22 and 24 are directed to the counting stages 20*a–d* to control whether or not the counter counts up or down in a binary fashion. This function is well known in the art of binary counting. When a pulse from scaler counter 84 is directed to the counter stages on LOAD or COUNT line 86, the stages of counter 20 are counted in the direction indicated by the logic on lines 22, 24. The section for the six digits of counter 20 are connected in accordance with the practice used in binary coded counters. The particular type of binary counter does not form a part of the present invention, and various changes could be made in the illustrated embodiment of FIG. 11 when practicing the invention. A Johnson type counter is illustrated, but other counters could be used.

If all stages I–IV of counter 20 are at a logic 0, a signal is created in ZERO line Z1. This is the line used in combination with a similar line from the other digit stages of counter 20 to determine a ZERO SENSE condition in counter 20. NOR gates 380–386 are associated with the counter stages 20*a–d*, respectively, and read the digit corresponding to the binary code in these stages. The output of these counter reading gates are labeled $\overline{A}$, $\overline{B}$, $\overline{C}$ and $\overline{D}$, and correspond to lines 54 in FIG. 1. These lines are also lines 94 shown in FIG. 1. Lines 54 are connected to a comparator circuit 60 shown schematically in FIGS. 12 and 14, and lines 94 are directed to a 7-Bar decoder 90 shown schematically at the left in FIG. 11. Decoder 90 has output lines *a–g* corresponding to lines 96 in FIG. 1 and used for controlling the visual display of the separate digits in 7-Bar display 92. When one of the multiplexing pulses D1–6 appear, the coding of one digit is directed to lines 94 which are in turn directed to decoder 90 and are decoded. Consequently, lines *a–g*, i.e. lines 96, contain the proper coding for displaying in the separate sections of display unit 92. When multiplexing pulse D1 occurs, lines 96 contain the decoded information in the first digit of counter 20. The next multiplexing pulse D2 creates in lines 94 the information in the second digit stage of counter 20. This process is repeated as the multiplexing pulses are repeatedly generated. Since the digit reading occurs quite rapidly in response to the multiplexing pulses on lines D1–6, the external display 92 appears to be continuous and reads the present condition of counter 20.

As previously mentioned, only one digit, in this instance, is shown in FIG. 11. Similar circuits are used for the remaining five digits of the counter 20 and memory circuit 50. Each of the remaining digits operate in the same manner.

COMPARE LOGIC CIRCUIT

Figure 12:
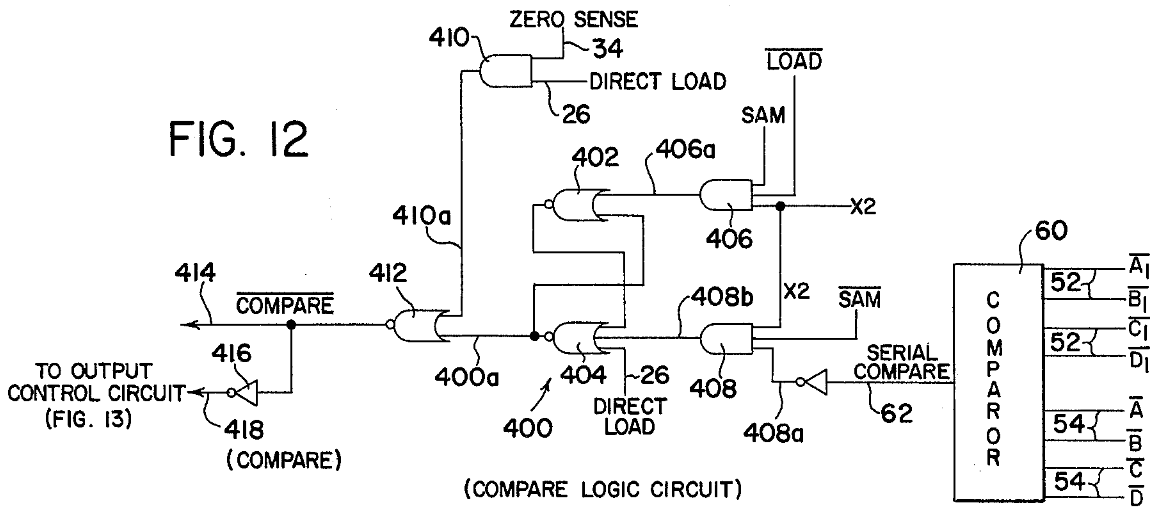
FIG. 12 is a logic diagram illustrating the compare logic circuit used in the preferred embodiment of the invention.

FIG. 12 illustrates the logic circuit for producing a SERIAL COMPARE signal. A variety of circuits could be used for this purpose; however, in accordance with the illustrated embodiment of the invention, a compare flip-flop 400 has an output 400*a* and NOR gates 402, 404. Gate 402 is controlled by an AND gate 406 having an output 406*a* and inputs connected to the SAM, $\overline{\text{LOAD}}$ and X2 lines. NOR gate 404 has an input connected to DIRECT LOAD line 26 and another input 408*b* which is the output of AND gate 408. This AND gate has one input connected to line 408*a* which is the inverted logic of the SERIAL COMPARE line 62. The other two inputs for AND gate 408 are $\overline{\text{SAM}}$ and X2. When the digits in counter 20 match, i.e. compare, with the digits set in the memory circuit 50, the comparator 60 produces a logic 1 in line 62. This circuit is better shown in FIG. 14 and will be explained later. The ZERO SENSE control of the circuit shown in FIG. 12 includes an AND gate 410 having as inputs ZERO SENSE line 34 and DIRECT LOAD line 26. The output of gate 410 is line 410*a* which, together with output 400*a* of flip-flop 400, control NOR gate 412 having the noninverted output 414, labeled $\overline{\text{COMPARE}}$, and an inverter 416 to produce an inverted output in line 418, labeled COMPARE.

Figure 13:
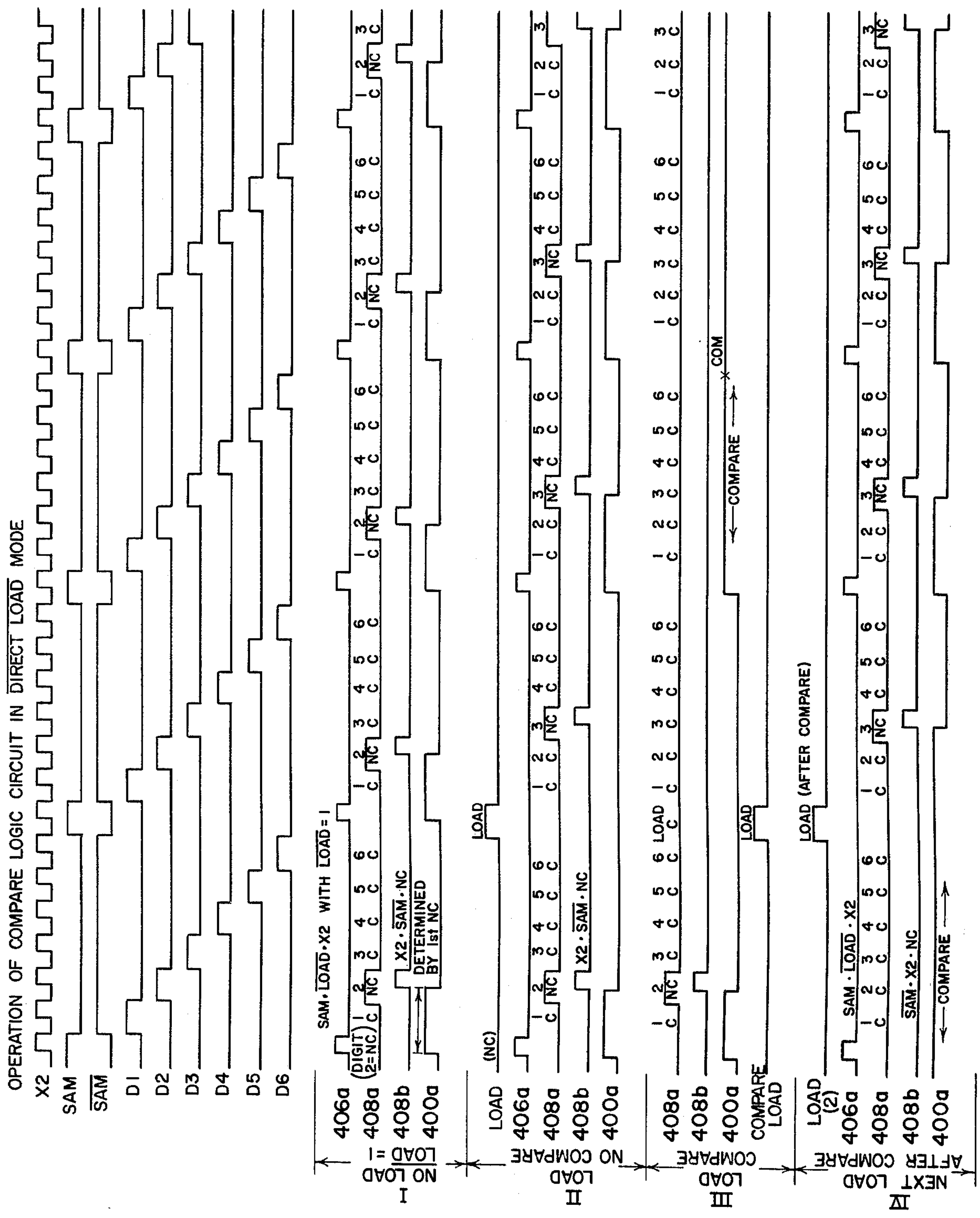
FIG. 13 is a chart showing the wave shapes created by the diagram of FIG. 12.

The operation of the circuit in FIG. 12 when in the $\overline{\text{DIRECT LOAD}}$ mode is set forth in FIG. 13. The upper portion of this figure illustrates the standard multiplexing pulses of the digital counting device A. Since a logic 0 appears in the DIRECT LOAD line when the device is operating in the $\overline{\text{DIRECT LOAD}}$ mode, AND gate 410 is latched to a zero output. As previously mentioned, the $\overline{\text{DIRECT LOAD}}$ mode of operation is a situation wherein the thumbwheel device 32 loads a designated number into the memory circuit 50 and counter 20 counts from zero to the memory number before creating an output pulse. Assume now that the circuit of FIG. 12 is operating at a steady state condition wherein there is no count being received and at least one of the six digits in the counter does not match the corresponding digit in the memory circuit. This situation is shown in the portion labeled I of FIG. 13. As can be seen, the digit which does not match is digit No. 2. Of course, other digits could also not compare in this particular example. Upon the concurrent appearance of a SAM pulse and an X2 pulse, line 406*a* shifts to a logic 1. This is shown in the first wave shape of portion I in FIG. 13. The second wave shape shows the logic on line 408*a* which goes to a logic 1 when a particular digit interrogated by a D1–6 multiplexing pulse does not compare from the counter to the memory circuit. Consequently, there is a logic 1 pulse concurrent with each D2 multiplexing pulse. The third wave shape represents the output 408*b* of gate 408. This output is a logic 1 only when there is no SAM pulse, an X2 pulse and a no SERIAL COMPARE signal. Consequently, this pulse occurs at each no comparison condition for the second half of the various multiplexing pulses D1–6. The fourth wave shape in portion I is a control line 400*a* which is the output of flip-flop 400. It is noted that flip-flop 400 produces a logic 1 in line 400*a* when a logic 1 appears in line 406*a*. In a like manner, when a logic 1 appears in line 408*b*, flip-flop 400 is toggled to produce a logic 0 in output line 400*a*. When line 400*a* is a logic 0, a subsequent pulse on the 408*b* line has no effect until after a reset pulse occurs on the 406*a* line. Thus, if more than one digit does not compare, the pulse has a length determined by the first non-comparing digit. If a logic 0 appears in line 410*a*, the output in line 414 is the opposite of the logic on line 400*a* and the output on line 418 is the same as the logic on line 400*a*. It is noted that the logic 1 pulses created on line 400*a* alternate back and forth in accordance with the logic on lines 406*a*, 408*b*.

The second situation labeled portion II in FIG. 13 represents the situation where there is a load pulse without this load causing comparison. Basically, line 408*a* shifts from a first comparison condition to a second comparison condition where, in the illustrated example, the third digit does not compare after the load pulse. Since a load appears at the same time as a SAM, there is one cycle of gate 406 which is skipped. This produces a longer delay between two of the pulses in line 400*a*.

Referring now to a third operating situation, labeled portion III, where the same load is received as was received in portion II, but where this load causes a comparison. When this happens, the logic on line 408*a* remains at a logic 0 during the total time of comparison and before the next count or load. Consequently, the logic on the output 400*a* is subsequent latched to a logic 1 until the next load is received or until counting device A is reset.

Portion IV in FIG. 13 relates to a situation where a load is received after a comparison has been made. In this instance, one of the digits, illustrated as digit No. 3 will no longer compare. When that happens, a pulse occurs in line 408*b* at multiplexing pulse D3. This toggles control flip-flop 400 to produce a logic 0 in line 400*a*. This removes the COMPARE signal and continues the operation of the circuit in FIG. 12 in accordance with the portion I of FIG. 13. The wave shapes illustrated in FIg. 13 control the output control circuit shown in FIG. 16 in a manner to be described later.

Figure 14:
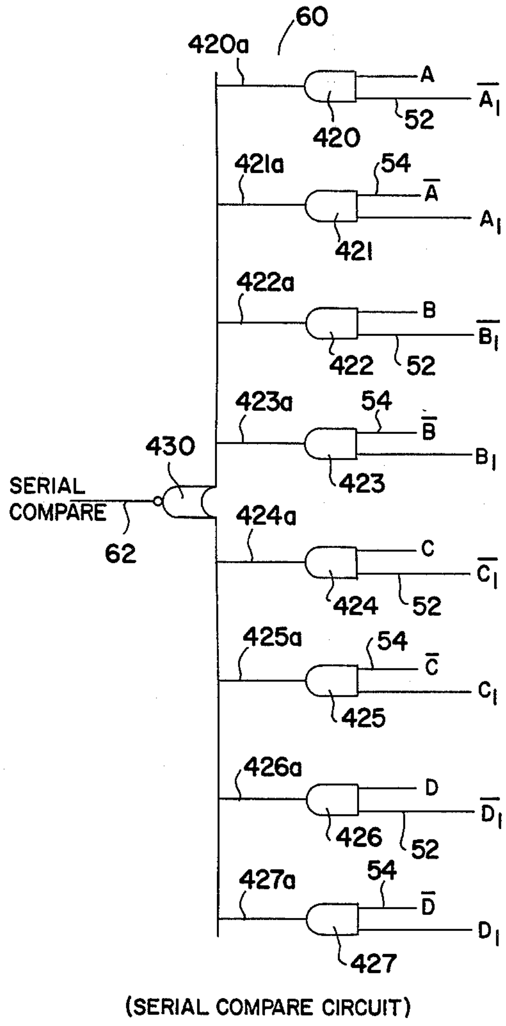
FIG. 14 is a logic diagram illustrating schematically a circuit for producing a SERIAL COMPARE signal.

Referring now to FIG. 14, a representative serial compare circuit is illustrated. This circuit includes AND gates 420–427 having outputs 420*a*–427*a*. When all of the inputs are at a logic 0, a logic 1 appears in SERIAL COMPARE line 62. The inputs to gates 420–427 are the lines shown in FIG. 11 and the inverted forms of these lines. The numerical coding corresponds with the coding shown in FIG. 11. As can be seen, when the multiplexing pulse occurs and all counter and memory stages corresponding to that multiplexing pulse compare, a logic 1 appears in line 62. After all multiplexing pulses have been created during a single processing cycle, a continuous logic 1 in line 62 indicates a comparison of all digits. This is shown by the 408a wave shape of portion III in FIG. 13. The NOR gate 430 receives the outputs 420*a*–427*a* for the purpose of controlling the logic on line 62.

Figure 15:
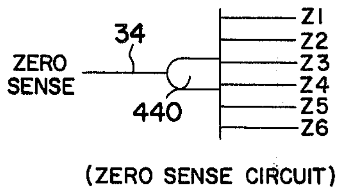
FIG. 15 is a logic diagram illustrating schematically a circuit for creating a ZERO SENSE signal.

In FIG. 15, a representative type of ZERO SENSE circuit is illustrated. In this circuit, the zero lines Z1–6 are directed to the input of an ANd gate 440 having an output which is the ZERO SENSE line 34. When all digits in counter 20 are at zero, a logic 1 appears in all lines Z1–6. This creates a logic 1 in ZERO SENSE line 34. Of course, other circuits could be used for producing a ZERO SENSE signal upon counter 20 reaching zero.

OUTPUT CONTROL CIRCUIT

Figure 16:
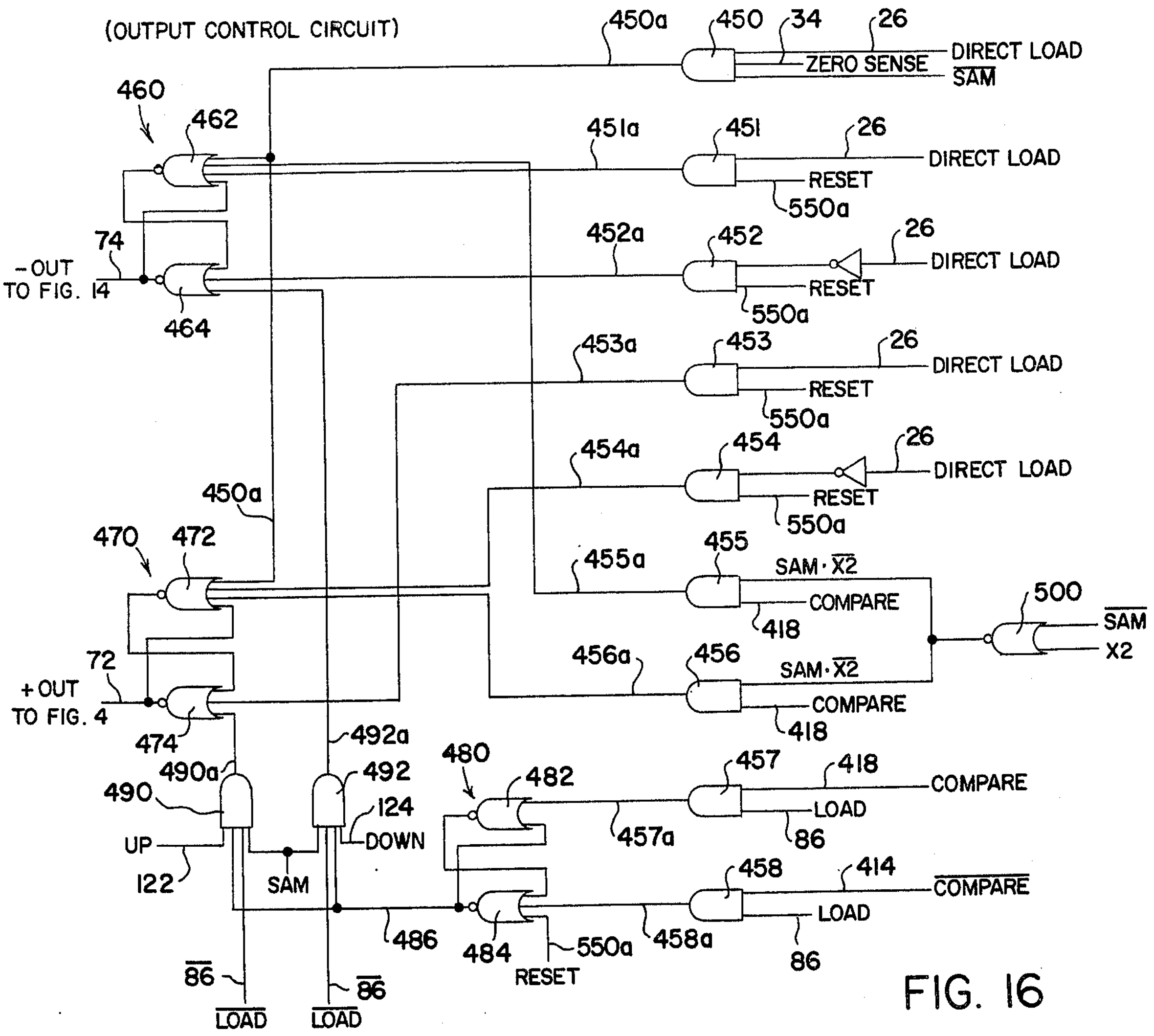
FIG. 16 is a logic diagram illustrating the output control circuit of the preferred embodiment of the invention.

Referring now to FIG. 16, there is illustrated an output control circuit for controlling the logic on + output line 72 and − output line 75. Other circuits could be used for accomplishing the desired output logic as set forth in FIGS. 3 and 4; however, in accordance with the illustrated circuit, a series of input gates 450–458 have inputs, as labeled, and outputs 450*a*–458*a*, respectively. The − output logic is controlled by flip-flop 460 including NOR gates 462, 464 and an output connected to line 74. In a similar manner, the + output is controlled by flip-flop 470 including NOR gates 472, 474 having an output connected to the output line 72. A flip-flop 480, including NOR gates 482, 484 and output 486, is used in combination with AND gates 490, 492 for controlling the output circuit when the counter is operated in a mode to count beyond the memory number or zero in counter 20.

The operation of the circuit shown n FIG. 16 can best be explained by discussing several examples and using the wave shapes shown in FIG. 13. As illustrated in FIG. 12, when the line 400*a* is logic 1, there is a logic 1 on COMPARE line 418. The COMPARE line and the inverse thereof, i.e. $\overline{\text{COMPARE}}$, are shown as inputs to gates 455–458 of FIG. 16. Assuming now that the digital counting device constructed in accordance with the present invention is operating in the $\overline{\text{DIRECT LOAD}}$ mode. In this mode, the thumbwheel device 32 loads the desired numerical value into memory circuit 50 at the start of a counting cycle. Assume now that the device A is reset to start a counting cycle. A logic 1 will appear at the output of gates 452, 454 at the time of the RESET pulse. Also, a logic 1 is applied to NOR gate 484 by line 550*a* so that a logic 0 appears in line 486 of flip-flop 480. Output line 452*a* toggles flip-flop 460 to a logic 0 in line 74.Line 454 *a* toggles flip-flop 470 to a logic 1 in line 72. With a logic 0 in line 486, a logic 0 appears at the outputs 490*a*, 492*a* of gates 490, 492, respectively. This condition is shown at the left in FIG. 4. When the RESET pulse is removed to start the counting cycle, the outputs of gates 450–454 are latched to a logic 0 and have no further controlling action in the counting cycle. Before a count is received or between counts, the inputs to gates 455–458 are controlled in accordance with line 400*a* in portion I of FIG. 13. With respect to gates 455, 456, it is noted that there is no comparison (COMPARE) at the same time that $\overline{\text{SAM}}$ and X2 are a logic 0. Indeed, the logic on line 400*a* shifts to a logic 1 then X2 is a logic 1. Thus, in this operating stage the output of NOR gate 500 is a logic 0 whenever there is a logic 1 on the COMPARE line 418. This is the non-comparison situation and gates 455, 456 have no effect while the circuit in FIG. 12 is awaiting a load or count. Since in this situation there is no count or load, a logic 0 remains in line 86 and the outputs 457*a* and 458*a* of gates 457, 458 are a logic 0. This prevents toggling of flip-flop 480.

Now assume that a load is received by the circuit of FIG. 12, as shown in portion II of FIG. 13. In this situation the count or load does not cause a comparison of counter 20 with the memory circuit 50. Consequently, nothing happens to the circuit shown in FIG. 16. A logic 1 does appear in output line 458*a;* however, line 486 is already at a logic 0 and is not affected by this change in logic at the output of gate 458. There is no concurrent existence of a COMPARE signal with the absence of a $\overline{SAM}$ and X2 pulse. Consequently, the outputs of gates 455, 456 remain zero. As long as counts are received by counter 20 without causing a comparison with memory circuit 50, the circuit of FIG. 16 rests in its reset condition.

Referring now to the situation shown in portion III of FIG. 13, the next load causes the number in counter 20 to compare, serially, with the number in memory circuit 50. This situation must be analyzed in separate stages. In the first stage, the load occurs. This again produces a logic 1 at the output of gate 458 because a COMPARE signal has not yet been developed on line 400*a*. At the next SAM and X2, a COMPARE signal is created in line 400*a*. However, at this SAM there is no COMPARE signal before the X2 appears. Consequently, the output of gates 455, 456 remain zero. When SAM and X2 pulses appear, 400*a* produces a COMPARE signal in line 400*a*. Line 400*a* is latched to a logic 1 because there is no subsequent logic 1 in line 408*b*, as shown in the next to last wave shape of portion III in FIG. 13. After the first SAM disappears, $\overline{SAM}$ shifts to a logic 1. This shifts the output of gate 500 to a logic 0 again. The gate will go to a logic 1 during the next subsequent SAM pulse. At this next SAM pulse, and before X2 shifts to a logic 1, a logic 1 appears on the output of gate 500. This occurs at the same time as a logic 1 exists in line 400*a*, which is the same logic as a COMPARE signal. When this occurs, a logic 1 appears at the output of both gates 455, 456 since there is a latched COMPARE signal. This point is labeled COM in line 400*a* of the portion III illustrated in FIG. 13. A logic 1 in lines 455*a*, 456*a* affects only flip-flop 460. It toggles this flipflop to a logic 1 output in line 74. Flip-flop 470 already has a logic 1 output and is not toggled. Thus, gates 455, 456, after a load has been made and compared produces a logic 1 in both outputs 72, 74. This illustrated at the SERIAL COMPARE point in FIG. 4.

Assuming now that device 20 is to count beyond the SERIAL COMPARE, as illustrated in portion IV of FIG. 13, the next load after comparison shifts the counter to a condition where there is no longer COMPARE signal. This condition is illustrated as a non-comparison at digit No. 3, which occurs at multiplexing pulse D3. Then X2 appears at the same time as a non-comparison in one of the digits, the logic on line 400*a* shifts back to a logic 0 to remove the COMPARE signal. Thereafter, the device operates as shown in portion I of FIG. 13. Referring again to FIG. 16, when the next load occurs after a comparison, there is a logic 1 in line 86 and a logic 1 in line 418, which corresponds to the logic in line 400*a*, shown in FIG. 13. Consequently, a logic 1 appears at the output 457*a* of gate 457. This toggles over-running flip-flop 480 to produce a logic 1 in line 486. As soon as the load disappears, line $\overline{86}$ shifts to a logic 1. On the next SAM pulse, since a logic 1 appears in the UP line 122, a logic 1 is created in output line 490*a* of AND gate 490. This toggles NOR gate 474 of flip-flop 470 to produce a logic 0 in the + output line 72. This is shown beyond the SERIAL COMPARE point in FIG. 4. Thereafter, the counting continues with the reverse logic on output lines 72, 74. Upon the next load, without a comparison signal, as shown in portion II of FIG. 12, the two inputs to gate 458 are a logic 1. This retoggles flip-flop 480 to a logic 0 in line 486. Of course, a RESET signal to the input of gate 484 will have the same function. In order to shift flip-flop 480 more rapidly, line 550a could be connected to the $\overline{SAM}$ line. This would shift flip-flop 480 so that line 490*a* toggles flip-flop 470.

The circuit illustrated in FIg. 16 operates quite similarly when operated in the DIRECT LOAD mode of counting device A. In this mode, the number from the thumbwheel device 32 is set into counter 20 and the counter is counted down until a ZERO SENSE signal is created within line 34 by a circuit similar to that shown in FIG. 15. In this mode of operation, the RESET pulse produces a logic 1 in line 451*a* and a logic 1 in line 453*a*. Consequently, the + output of line 72 is a logic 0 and the + output of line 74 is a logic 1. This is shown in the starting RESET condition of FIG. 3. When the RESET pulse disappears, outputs 451*a*–454*a* remain at a logic 0 and are no longer operative in the counting cycle. The circuit of FIG. 12 still operates as indicated before; however, its operation is pre-emptied by gate 410. Before a ZERO SENSE pulse, the output of 410 is a logic 0. Consequently, this circuit of FIG. 16 operates as previously discussed before a COMPARE signal is created in line 418. After the counting cycle has continued until counter 20 reaches zero, a logic 1 appears in ZERO SENSE line 34. This produces a logic 1 at the output of gate 410 of FIG. 12. Consequently, the COMPARE output 418 is latched to a logic 1. At the same time, the output of gate 450 becomes a logic 1 as soon as the SAM pulse disappears following a ZERO SENSE signal. This directs a logic 1 to both gates 462, 472. Consequently, a logic 1 now appears in both lines 72, 74. This is shown as the ZERO SENSE point in FIG. 3. When the load that creates a ZERO SENSE signal has been received, there is a logic 1 on lines 86, 418. Consequently, a logic 1 appears in output line 457*a*. This toggles flip-flop 480 to a logic 1 in line 486. As soon as the next SAM appears after the load signal has disappeared, a logic 1 can be developed on line 492*a* to toggle flip-flop 460 to a logic 0 output in the − output 74. This is shown beyond the ZERO SENSE line in FIG. 3. Toggling of flip-flop 480 can not take place until the COMPARE signal is removed which is the next count or load signal after the ZERO SENSE position. This creates a logic 1 in line 414 and a logic 1 in line 86.

The above description illustrates the basic operating functions of the circuit shown in FIG. 16. Of course, various modifications can be made in this logic diagram to accomplish the intended functions for use in the present invention.

OUTPUT COMPARE AND OXO CIRCUITS

Figure 17:
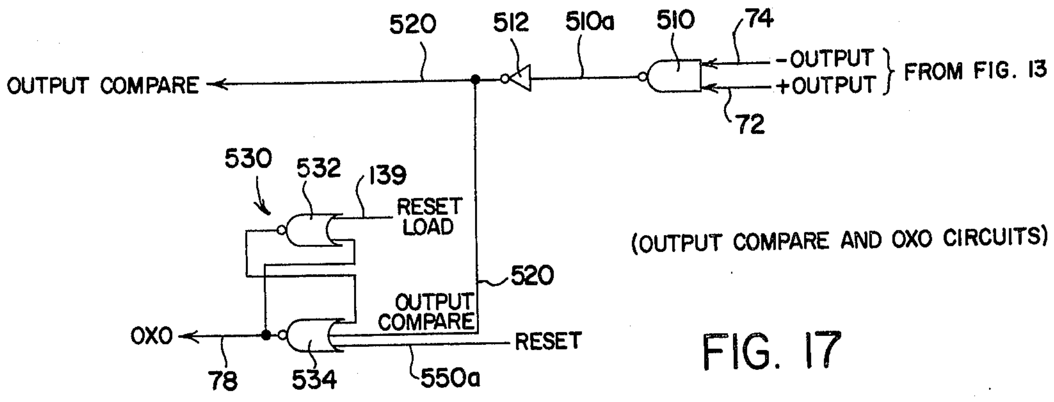
FIG. 17 is a logic diagram illustrating the circuit for producing an OUTPUT COMPARE signal and an OXO output for use in the preferred embodiment of the invention.

Referring now to FIG. 17, the OUTPUT COMPARE signal creating logic is illustrated. A NAND gate 510 has two inputs connected to the + output line 72 and the − output line 74. Of course, these lines are also connected to output terminals of chip 10. As previously discussed in connection with the control circuit of FIG. 16, outputs 72, 74 are a logic 1 when there has been a ZERO SENSE or a SERIAL COMPARE of the counter to the memory. When this happens, a logic 0 appears in output line 510*a* of gate 510. An inverter 512 inverts the logic on line 510*a* to produce the OUTPUT COMPARE signal in line 520. Consequently, when a logic 1 appears on both output lines 72, 74 a logic 1 appears in line 520. This creates an OUTPUT COMPARE signal which is used in the circuit described in FIG. 19. To create the OXO output in line 78, there is provided an OXO flip-flop 530 including NOR gates 532, 534. Gate 532 has an input connected to the RESET LOAD line 139. Gate 534 has one input connected to the OUTPUT COMPARE line 520 and another input connected to RESET line 550*a*.

Figure 18:
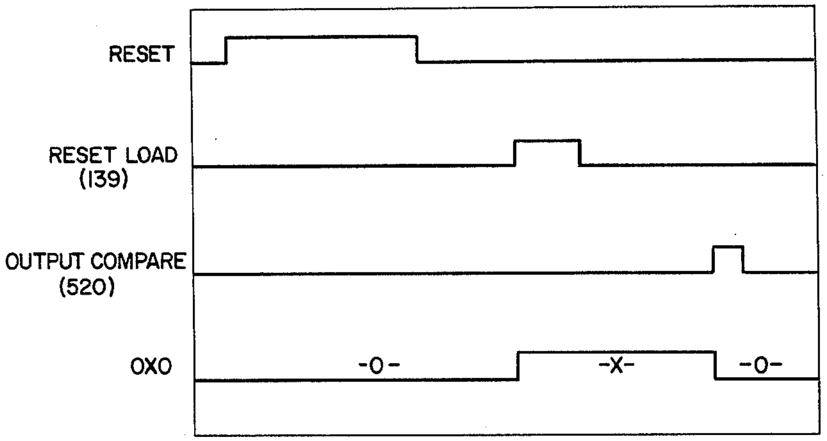
FIG. 18 is a chart showing certain operating characteristics of the logic diagram shown in FIG. 17.

The operation of the OXO flip-flop 530 is illustrated in the graph of FIG. 18. When a RESET pulse is received, the OXO line 78 is a logic 0. It remains a logic 0 until there is a RESET LOAD pulse in line 139. This produces a logic 1 in OXO line 78 which continues for the counting cycle of the digital counting device A. When there has been a SERIAL COMPARE or a ZERO SENSE, according to which operation mode is being used, an OUTPUT COMPARE signal is created in line 520. This produces a logic 0 at the output of NOR gate 534 to shift line 78 to a logic 0. Consequently, the OXO line remains a logic 1, i.e. the X condition, during the counting cycle. The use of OXO output 78 will be more fully appreciated when the peripheral circuitry of the preferred embodiment is discussed later in relation to FIG. 24.

STARTING CIRCUIT

Figure 19:
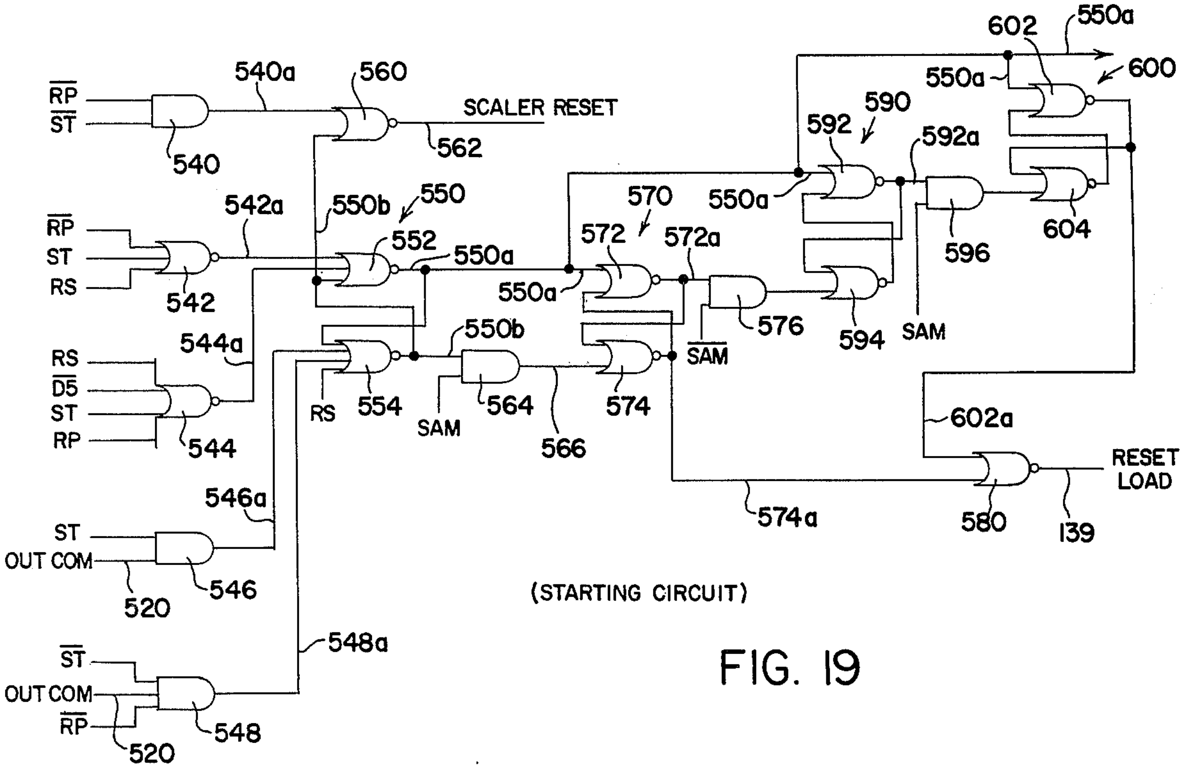
FIG. 19 is a logic diagram illustrating the starting circuit used in the preferred embodiment of the invention.

The starting circuit for the digital counting device A is schematically illustrated in FIG. 19 wherein the input terminals are labeled ST representing START, RP representing REPEAT and RS representing RESET. By applying different logic to these input terminals ST, RP and RS, the starting circuit of FIG. 19 is operated at different modes which are shown in FIGS. 20–23. In accordance with the circuit of FIG. 19, a logic 0 on the ST terminal represents a START SIGNAL, a logic 0 on the RP terminal represents a REPEAT signal, and a logic 1 on the RS terminal represents a RESET signal. The RESET signal is not the internal RESET line, as previously discussed. A RESET signal resets the internal circuits of the digital counting device A to prepare it for a counting operation. Consequently, a logic 0 must be on the RS terminal during operation of the digital counting device A.

The starting circuit shown in FIG. 19 includes an AND gate 540 having an output 540a, NOR gates 542, 544 having an output 542*a*, 544*a*, respectively, and AND gates 546, 548 having outputs 546*a*, 548*a*, respectively. The circuit includes a first flip-flop 550 formed from NOR gates 552, 554 and having outputs 550*a*, and 550*b*. The output 550*a* is the RESET line used internally of the digital counting apparatus A and which has been discussed previously. This RESET line is different than the incoming reset logic on terminal RS. A scaler reset NOR gate 560 has an output 562, labeled SCALER RESET. This output is directed to the scaler counter 84 shown in FIG. 9 for the purpose of resetting the sections of the scaler counter when a logic 1 appears on the SCALER RESET line. An AND gate 564 is controlled by a SAM pulse and output 550*b* from flip-flop 550. This gate has an output 566 which is directed to a second flip-flop 570 including NOR gates 572, 574 and having outputs 572*a*, 574*a*. The first of these outputs controls AND gate 576 together with a $\overline{\text{SAM}}$ pulse. The second output 574*a* is directed to NOR gate 580 for creating a RESET LOAD pulse in line 139. The next flip-flop 590 is formed from NOR gates 592, 594 and has an output 592*a* directed to the input of AND gate 596 which is also controlled by a SAM pulse. At the end of the starting circuit there is a final flip-flop 600 having NOR gates 602, 604 and an output 602*a* which is directed to the other input of NOR gate 580 for controlling the logic on the RESET LOAD line 139.

Figure 20:
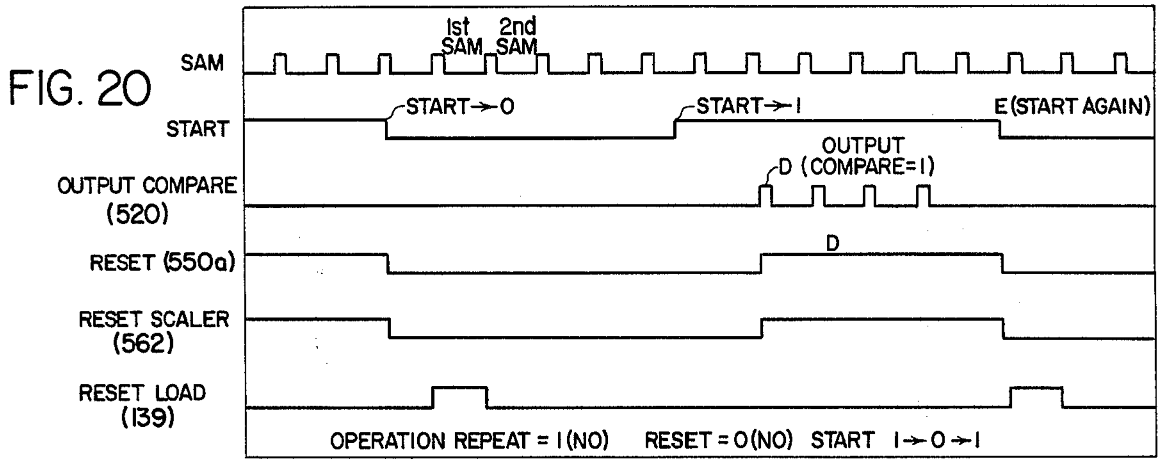
FIG. 20 is a chart showing the wave shapes used and developed by the diagram shown in FIG. 19 for the selected operating mode of the preferred embodiment.

Referring now to FIG. 20, one of the more common modes of operation for the digital counting device A is illustrated wherein the start terminal ST is pulsed from a logic 1 to a logic 0 and then back to a logic 1. This produces a logic 0 pulse at the ST terminal of the starting circuit. The operation is the same for both the DIRECT LOAD mode of operation and the $\overline{\text{DIRECT LOAD}}$ mode of operation. With the ST terminal at a logic 1, there has been a previous internal RESET of the counter circuit and of the scaler counter. Consequently, a logic 1 exists in RESET line 550*a* and SCALER RESET line 562. This is shown at the left of FIG. 20. Before a start actuation, a logic 1 is on the ST terminal; therefore, the output 542*a* of gate 542 is a logic 0 which does not affect the basic flip-flop 550. With a logic 1 appearing in the RESET line 550*a*, a logic 0 appears at the input of AND gates 564, 576, and 596. A logic 1 appears in line 574*a* while a logic 0 appears in line 602*a*. For this reason, a logic 0 appears in the RESET LOAD line 139. When a logic 0 is applied to the ST terminal, all inputs to gate 542 are at a logic 0. This produces a logic 1 in output 542*a* to toggle flip-flop 550. Consequently, a logic 0 appears in RESET line 550*a* to remove the RESET signal. In a like manner, a logic 1 appears in line 550*b* to produce a logic 0 in line 562 controlled by gate 560 and a logic 1 at one input of gate 564. Thus, the SCALER RESET pulse disappears. The first SAM after the ST terminal has been shifted to a logic 0 produces tow logic 1 signals at the inputs of AND gate 564. Consequently, the output 566 is shifted to a logic 1. This toggles flip-flop 570 to produce a logic 0 in line 574*a*. A logic 1 appears in line 572*a* at the input of gate 576; however, a $\overline{\text{SAM}}$ is at a logic 0 at the first SAM pulse. A logic 0 in line 574*a* combines with the existing logic 0 in line 602*a* to produce a logic 1 in the RESET LOAD line 139 to produce a RESET LOAD pulse. This is shown in the lower graph of FIG. 20. When the SAM pulse disappears, two logic 1 signals are directed to the inputs of AND gate 576. This produces a logic 1 at the input of NOR gate 594 to toggle flip-flop 590. Consequently, a logic 1 appears in line 592*a* at the input of AND gate 596. However, since there is not yet a SAM pulse, the other input to gate 596 is a logic 0 producing no shift of the logic in flip-flop 600. Upon the occurrence of the second SAM pulse after the START pulse, a logic 1 appears in the SAM line which is directed to gate 596. This produces a logic 1 at both inputs of gate 596, and a logic 1 at the input of gate 604. Consequently, flip-flop 600 is toggled to produce a logic 1 in line 602*a*. When this happens, a logic 0 appears in the RESET LOAD line 139. The RESET LOAD pulse then disappears as shown in the lower line of FIG. 20. By using this circuit, the RESET LOAD pulse has a width substantially equal to the spacing between adjacent SAM pulses. The circuit shown in FIG. 19 is now in a steady state condition awaiting the termination of the cycle by a pulse on the OUTPUT COMPARE line 520 which is directed to the inputs of gates 546, 548. Since the RP terminal is at a logic 1, a logic 0 appears in the $\overline{\text{RP}}$ line. This prevents actuation of gate 548. Upon the receipt of the OUTPUT COMPARE signal, the output 546*a* of gate 546 is shifted to a logic 1. This toggles main flip-flop 550 to produce a logic 1 in RESET line 550*a*. In a like manner, line 550*b* shifts to a logic 0 to produce a logic 1 in SCALER RESET line 562. A logic 1 in the RESET line 550 *a* also toggles flip-flop 570, 590 and 600 to produce a logic 0 at the upper outputs. This provides a logic 0 in line 602*a* and a logic 1 in line 574*a*. Consequently, the RESET LOAD line 139 remains at a logic 0 as is clearly shown in FIG. 20. A logic 0 appears at the inputs of AND gates 564, 576, and 596. This is the condition shown at the left of FIG. 20. This condition remains until a logic 0 signal is again placed on the ST terminal. Then the cycle is repeated by first producing a RESET LOAD pulse and then both a RESET pulse and a SCALER RESET pulse upon receipt of an OUTPUT COMPARE signal.

Figure 21:
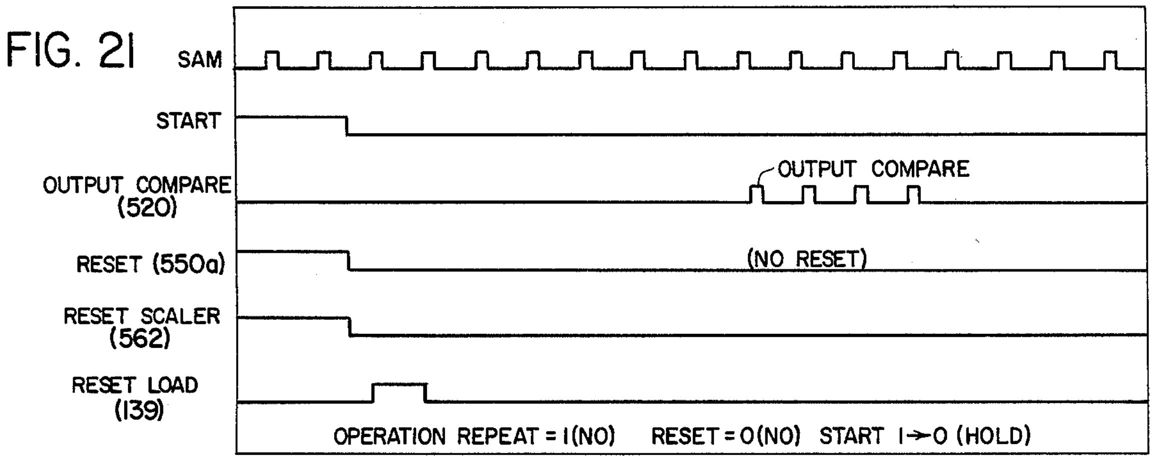
FIGS. 21, 22 and 23 are charts similar to that shown in FIG. 20 for different modes of operation employed in the preferred embodiment of the invention; and, FIG. 24 is a wiring diagram showing the LSI chip used in accordance with the preferred embodiment of the present invention and the peripheral circuitry used with the chip in the preferred embodiment.

Referring now to FIG. 21, a second mode of operation is indicated wherein the REPEAT and RESET terminals are at a logic which indicates that there is no repeat or reset. The terminal ST is shifted to a logic 0 and held. As shown in the left of FIG. 21, this immediately removes the RESET pulse and the SCALER RESET pulse. After two SAM pulses, the RESET LOAD occurs and disappears as discussed in connection with the operation illustrated in FIG. 20. However, since the ST terminal remains a logic 0, there can no toggle of flip-flop 550 by gate 546 when an OUTPUT COMPARE signal is created. Consequently, the digital counting device A continues to count even after there has been an OUTPUT COMPARE pulse. The counter is stopped by applying a logic 1 to the RESET terminal RS. This mode of operation allows counting beyond ZERO SENSE or SERIAL COMPARE.

Figure 22:
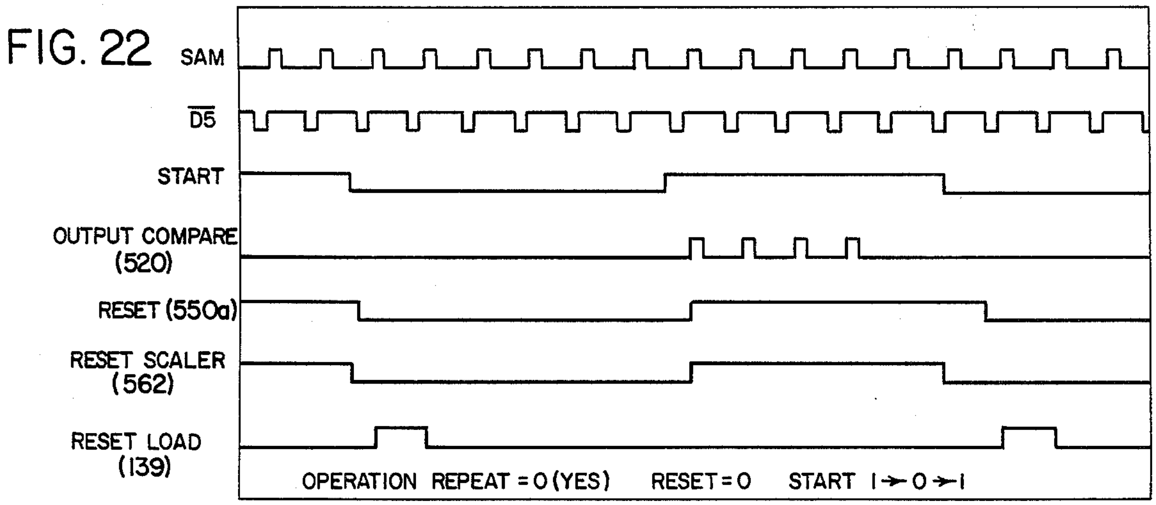
Figure 23:
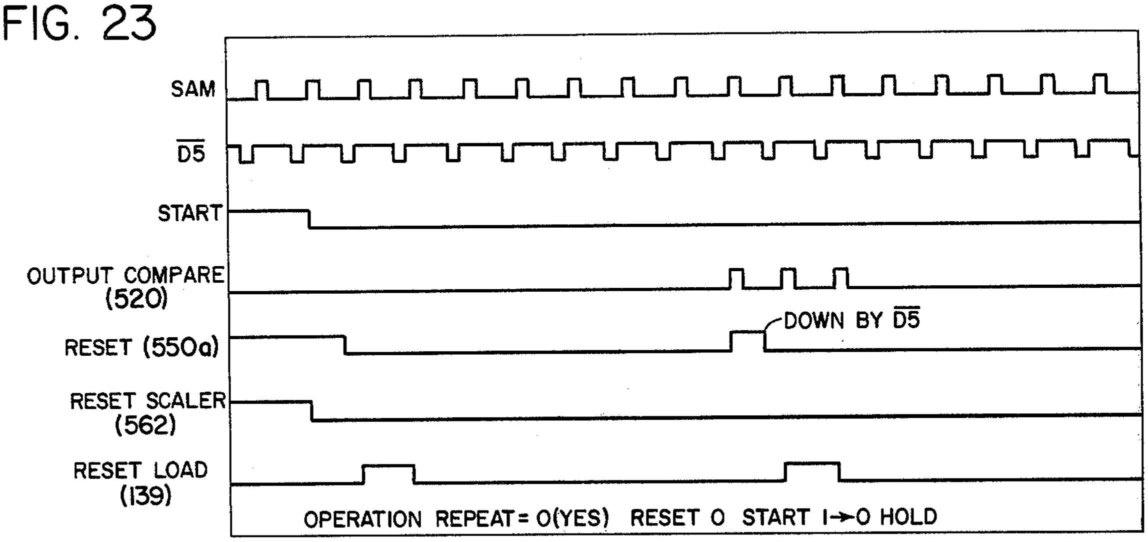

Referring now to FIG. 22, another mode of operation is illustrated. In this mode, the REPEAT terminal RP is set to a logic 0. The START terminal ST is pulsed to a logic 0 and then back to a logic 1. In this operation, digital counting device A operates substantially in accordance with the operation shown in FIG. 20, except that the SCALER RESET line 562 is shifted to a logic 0 by gate 540 as soon as the logic on the ST terminal is shifted to a logic 0. The RESET pulse is shifted to a logic 0 later when there is no D5 multiplexing pulse. This is controlled by the $\overline{D5}$ line at NOR gate 544. When a comparison signal appears on the OUTPUT COMPARE line 520, digital counting device A is reset. The starting operation is repeated upon again pulsing the ST terminal to a logic 0. This is shown to the right in FIG. 22. It is seen from this figure that the repeat operation can not be accomplished, in the illustrated embodiment of the invention by merely shifting REPEAT terminal RP to a logic 0. The repeat operation requires that the logic on terminal ST be shifted and held to a logic 0. This is shown in FIG. 23. In this mode of operation, the shifting of the START logic on the ST terminal to a logic 0 first causes the SCALER RESET pulse to disappear. At the next D5 multiplexing pulse, the RESET pulse disappears. Thereafter, AND gates 564, 574, 576 and 596 create and remove a RESET LOAD pulse in line 139. This process has been previously described. As soon as there has been a comparison, a logic 1 appears in the OUTPUT COMPARE line 520. This produces a logic 1 in output 548*a* of gate 548. In this manner, flip-flop 550 is toggled to produce a logic 1 in the RESET line 550*a*. As soon as a D5 multiplexing pulse occurs, all inputs to NOR gate 554 shift to a logic 0. This produces a logic 1 in output 544*a* of gate 544. Flip-flop 550 is again toggled to produce a logic 0 in the RESET line 550*a*. Thus, as soon as there is a comparison by the digital counting device A, operating in the repeat mode, a RESET cycle is started with the comparison signal and is stopped with the next D5 multiplexing pulse as shown in FIG. 23. The RESET pulse to reset the counters has a width of about 6/7 of the processing cycle time. This provides sufficient time for the reset function during repeat operation of counting device A. As flip-flop 550 is toggled to create the RESET pulse, the AND gates 564, 576, and 596 are again operative to produce a RESET LOAD pulse in line 139. This is also shown in FIG. 23. When operating in the repeat mode by holding the start logic to a logic 0, as soon as there is a comparison the system is reset, except for scaler counter 84, which continues to count in the same direction. This prevents any error during the repeat operation. This is especially necessary when the scaler counter is operating in the divide by 5/6 mode.

A review of the starting circuit shown in FIG. 19 and the operating curves of FIGS. 20–23 together with the above description illustrates the operation of the starting circuit in accordance with the illustrated embodiment of the invention.

PERIPHERAL CIRCUITRY

Figure 24:
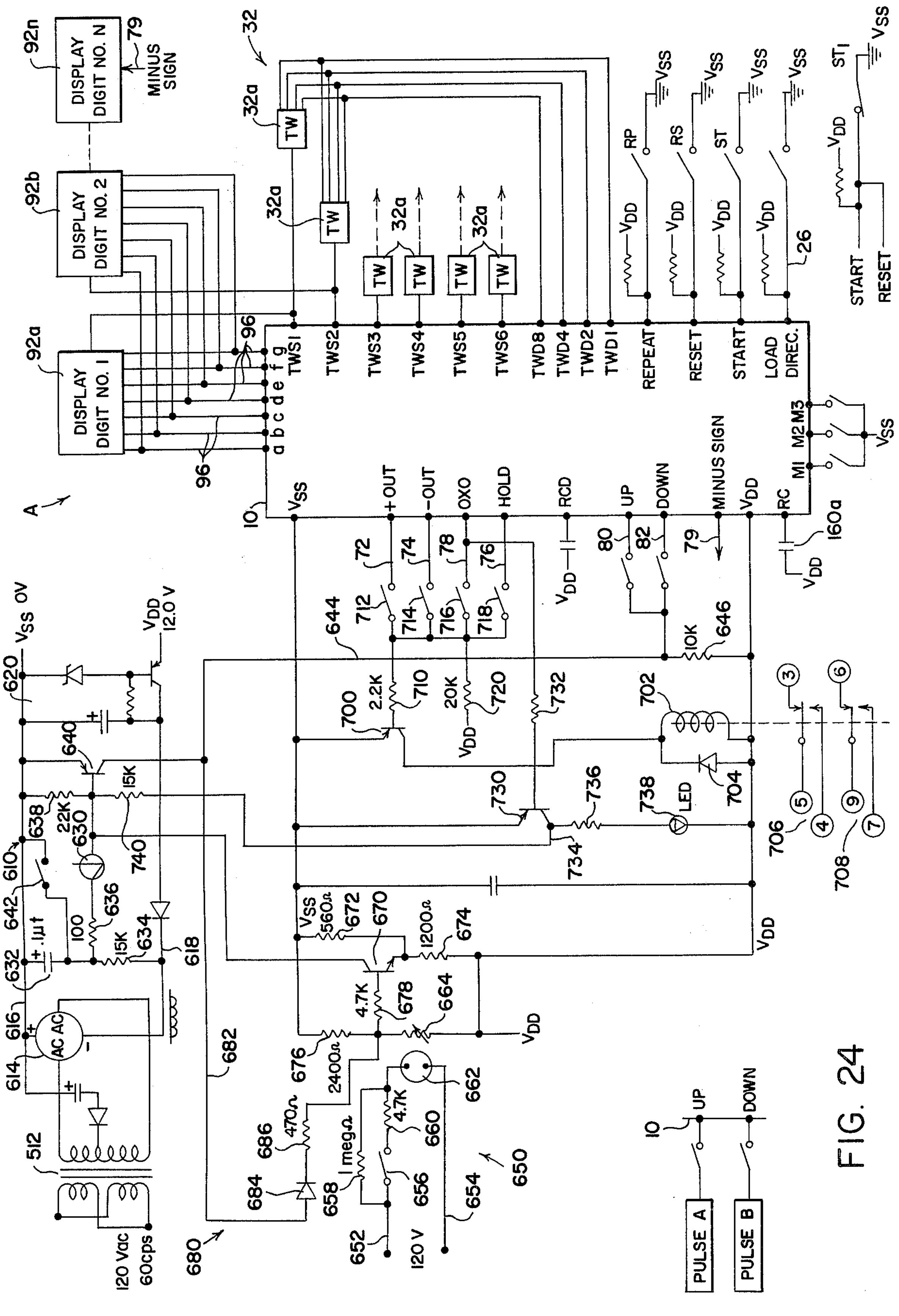

Referring now to FIG. 24, the circuitry and components external of the LSI chip 10 for one illustrated embodiment are shown schematically. Thumbwheel device 32 is divided into six sections 32*a*. Each of these sections include a binary decoding network controlled by a manually movable thumbwheel corresponding to a digit. These sections are controlled by the logic on one of the TWS lines. The outputs from the thumbwheel sections 32*a* are multiplexed into chip 10 on the TWD lines by the TWS lines. Consequently, as the multiplexing pulses D1–6 appear internally of chip 10, the TWS lines are serially activated. This multiplexes the information from the thumbwheel device into the memory and/or counter. The terminals *a–g* are connected in parallel with the inputs of several 7-Bar display units labeled 92*a–n*. Each of the display units, such as unit 92*a*, is controlled by one of the TWS lines. Consequently, when the logic of a given digit from counter 20 appears on the *a–g* lines, a corresponding TWS line is activated to multiplex the proper display into the appropriate display unit. Since the multiplexing lines D1–6 appear once each 200 μ3, the display in the various display units appears to be continuous and changes only when the number in counter 20 of chip 10 changes. The starting terminals labeled REPEAT, RESET, and START, are controlled by the switches RP, RS and ST, respectively. The operation of these switches has been previously described. Voltage $V_{SS}$ is a zero voltage, and voltage $V_{DD}$ is −12.0 volts. A modification of the control on the START, RESET terminals is illustrated in the lower right hand portion of FIG. 24. In this embodiment, a switch ST is shifted between START and RESET. Consequently, as soon as the START logic 0 is removed a RESET logic 1 is directed to the RESET terminal. This produces an immediate reset of device A after the start logic 0 has been removed. In this manner, the digital counting device A is in the start mode until the start switch $ST_1$ is opened which immediately resets the internal circuits of the chip 10. The m1, M2 and M3 lines are coded in accordance with the switches illustrated in FIG. 24. A terminal labeled MINUS SIGN is connected to line 79 which is directed to one of the display units to create a minus sign when a proper logic appears on line 79.

To produce a controlled voltage supply for chip 10 and to produce a clocking pulse for use by the chip when the chip is operating in a timing mode, a variety of circuits could be provided; however, in accordance with the illustrated embodiment of the invention, circuit 610 performs these two functions. A transformer 612 is driven by standard 120 volts A.C. line current at 60 cps. Of course, 50 cps line current could be used. By changing the coding of scaler counter 84, other clocking frequencies could be used. A standard diode bridge 614 produces a ripple D.C. output as indicated by the wave shape at the lower portion of circuit 610. This wave shape includes 120 pulses per second and is directed between spaced lines 616, 618. Circuit 620 is a standard voltage regulating circuit to produce a standard voltage on lines $V_{SS}$ and $V_{DD}$. These voltages are zero volts, −12.0 volts, respectively, and are used throughout the various circuits shown in the drawings. To produce pulses on input lines 80, 82 there is a voltage responsive breakdown device 630 controlled by a capacitory 632 and resistors 634, 636 and 638. This voltage breakdown device is connected to the base of transistor 640. In operation, as each pulse appears between lines 616, 618 capacitor 632 is charged. When it reaches approximately −7.5 volts, device 630 fires to forward bias transistor 640. The switch 642 is a main switch which turns off the circuit and prevents any pulsing to the chip 10. When transistor 640 is conductive, a pulse is applied by line 644 across resistor 646. This pulses either UP input line 80 or DOWN input line 82 according to which of the two switches is closed. Since the pulses are repetitive, a timing function is performed by the circuitry within the chip 10. When using device A to totalize, both switches of inputs 80, 82 would be closed and would be connected to different input pulsing circuits. A pulse on input 80 would cause up counting and a pulse on input 82 would cause down counting. This operation is illustrated at the lower left portion of FIG. 24.

For counting by the circuits in chip 10, switch 642 of circuit 610 is closed, and the counting pulse circuit 650 is used. This circuit includes a 110 volts A.C. input across lines 652, 654. A switch 656 is shunted by a large resistor 658 and is placed in series with a current limiting resistor 660. The output of the counting circuit is a neon tube or other glow device 662. In operation, a count is introduced by closing switch 656. This lights neon tube 662. When switch 656 is open, a small amount of current flows through the large resistor 658 to maintain a low level of glow in tube 662. This assures more rapid response upon the closing of switch 656. Neon tube 662 is positioned in light transmission relationship with a photosensitive resistor 664 which has a lower resistance upon receipt of light from the neon tube. This resistor controls the conductivity transistor 670 which is also controlled by an emitter voltage divider including resistors 672, 674 and a base voltage divider including the photosensitive resistor 664 and 676. The standard current limiting resistors 678 is connected in the base circuit of transistor 670. The collector of transistor 670 is connected to the base of transistor 640 so that conduction of transistor 670 forward biases transistor 640 into conduction to create an input on one of the input lines 80, 82 in a similar manner as the clocking pulses when chip 10 is used for timing. Only one of the switches at lines 80, 82 are closed at any given time. Two circuits similar to circuits 650 could be used when totalizing. Each pulse circuit would then be connected to one of the input lines 80, 82 as shown in the lower left hand portion of FIG. 24.

In operation, when there is very little light emitted from neon tube 662, resistance of photosensitive resistor 664 is relatively high. Consequently, the base of transistor 670 is forced toward $V_{SS}$ to reverse bias the transistor. By closing switch 656, neon tube 662 glows brightly. This reduces the resistance of resistor 664 drawing the base of transistor 670 toward the −12 volt line $V_{DD}$. This forward biases transistor 670 causing it to conduct. In this manner, transistor 640 conducts to direct a pulse to one of the input terminals 80, 82. The particular terminal receiving the pulse is determined by closing one of the switches connected to the terminals 80, 82.

To assure that a pulse is received and held during the counting operation until neon tube 662 is terminated by opening switch 656, there is provided a feedback circuit 680 including line 682 connected to line 644, a diode 684, poled as indicated, and a resistor 686. As soon as transistor 640 becomes conductive, line 682 is connected to the $V_{DD}$ line through resistor 646. This clamps the base of transistor 670 to a conducting bias until the resistance of resistor 664 rises abruptly upon termination of the neon tube 662.

Referring now to the output terminals for chip 10, in accordance with the illustrated embodiment, these terminals control an output transistor 700 in series with a solenoid coil 702 and paralleled by a diode 704, poles as shown in FIG. 24. This coil controls one or more groups of switches, illustrated as switches 706, 708. A current limiting resistor 710 connects the base of transistor 700 to a network of switches including switches 712, 714, 716 and 718 which, when closed, are connected to output lines 72, 74, 78 and 76, respectively. The switch network is in turn connected to the $V_{DD}$ line through resistor 720. When one of the switches 712, 714 or 718 is closed, transistor 700 is controlled by the output associated with that particular switch. For instance, assuming that switch 712 is closed, as long as a logic 0 appears in line 72, transistor 700 is reverse biased and no current flows through coil 702. As soon as a logic 1 appears in line 72, the base of transistor 700 is connected to the $V_{DD}$ line through resistor 720. This forward biases transistor 700 to cause current flow in coil 702. In this manner, the switches associated with coil 702 are shifted to their energized position. If the output is to be held, switch 718 is closed so that the coil 702 is held for a designated time. In the preferred embodiment of the invention this time is 50 ms. Transistor 700 functions in the same manner when switch 714 is closed. Then transistor 700 is controlled by the − output line 74. The circuit shown in FIG. 24, uses only one of the switches 712 or 716 to operate coil 702. Of course, since the logic changes in accordance with FIGS. 3 and 4, various separate output circuits could be controlled by the four outputs 712–718. Combinations of the output switches could be used.

In accordance with the preferred embodiment of the invention, the digital counting device A includes OXO output 78 for counting only during a selected period determined by a logic 1 at this output. One circuit to accomplish this function is illustrated in FIG. 24. In accordance with this embodiment, a transistor 730 includes a base connected to the OXO output 78 through a current limiting resistor 732. Transistor 730 includes a collector 734 which is connected through resistor 736 and a light emitting diode 738 to the $V_{DD}$ line. The collector is also connected through resistor 740 to base a transistor 640 by line 734. To cause operation of the OXO function, switch 716 must be closed. This is to provide sufficient voltage and current to operate transistor 730. When this switch is closed and the OXO output is at a logic 0, transistor 730 is reverse biased. This turns off LED 738 and clamps the base of transistor 640 to the $V_{DD}$ line. Consequently, transistor 640 cannot introduce pulses into the input lines 80, 82. When the output OXO is at a logic 1, transistor 730 is forward biased, which turns on the LED 738 and releases transistor 640 by connecting its base to the $V_{SS}$ line. It can be seen that by closing switch 716, the LED 738 indicates a counting cycle and prevents subsequent pulses from being introduced into the chip after the counting cycle has been concluded. This function is useful in repeat modes. In addition, it can be used without any displays to show when the counter is counting or timing.

The operation of digital counting device A is clearly apparent from the above description of FIG. 24 taken together with the description of the basic functions performed by the circuits within the LSI chip 10. Of course, certain modifications could be made without departing from the intended spirit and scope of the present invention as defined in the appended claims.

Having thus defined my invention, I claim:

1. A digital counting device for counting input pulses and producing an output signal after a given number of said input pulses, said counting device comprising: a binary counter responsive to input counts and having a first mode select means for causing up binary counting of said counter upon receipt of input counts and a second mode select means for causing down binary counting of said counter upon receipt of input counts; a binary memory circuit; means interconnecting said binary counter and said binary memory circuit for creating a compare signal when the binary number of said binary counter corresponds to the binary number in said memory circuit; means for creating a sense signal when said binary counter reaches a given number; means responsive to either of said compare signal or said sense signal for creating said output signal; means for selecting a binary coded number; first control means including means for loading said selected coded number into said counter and means for activating said second mode select means; a second control means including means for loading said selected number into said memory circuit and means for activating said first mode select means; means for selecting only one of said control means; and, means for introducing input pulses to said counter.

2. A digital counting device as defined in claim 1 including means for activating one of said control means in response to said output signal for repeating the counting cycle of said device.

3. A digital counting device as defined in claim 1 including means responsive to said sense signal for shifting from second select mode to said first select mode.

4. A digital counting device as defined in claim 1 including means responsive to said output signal for inhibiting said counter.

5. A digital counting device as defined in claim 1 including means for maintaining said output signal for a selected time.

6. A digital counting device as defined in claim 1 including first and second output terminals each having a one bit binary logic output and means responsive to an input count after said output signal for reversing the logic on said terminals.

7. A digital counting device as defined in claim 1 wherein said memory circuit and said binary counter are divided into n-stages each corresponding to a digit of said selected number, a plurality of binary coding networks each corresponding to one of said selected digits, manual means for setting each of said networks to a desired digit of said selected number, means for connecting said networks in parallel to said stages of said counter and memory circuit, means for creating in succession n multiplexing signals, means responsive to each of said multiplexing signals for directing the set code of a selected one of said networks into said connecting means and means responsive to each of said multiplexing signals for allowing a selected one of said stages of said counter and said memory circuit to accept said set code on said connecting means.

8. A digital counting device as defined in claim 7 including means for visually displaying the digit in each stage of said counter during the operation of said device.

9. A digital counting device as defined in claim 1 wherein said memory circuit and said binary counter are divided into stages corresponding to digits and means for visually displaying the digit in each stage of said counter during operation of said device.

10. A digital counting device as defined in claim 1 wherein said given number is zero.

11. A digital counting device as defined in claim 1 including means for inhibiting said input counts.

12. A digital counting device as defined in claim 11 wherein said inhibiting means is responsive to said output signal.

13. A digital counting device as defined in claim 1 including means for creating said input counts, said creating means includes a circuit for generating a series of control pulses having a known frequency, and a divider means for producing one input count upon the creation of a preselected number of control pulses.

14. A digital counting device as defined in claim 13 wherein said divider means includes means for selectively changing said preselected number.

15. A digital counting device as defined in claim 1 including means for creating said input counts, said creating means includes means for a circuit for generating a series of control pulses having a known frequency, first and second input circuits each having an input and an output, means responsive to a signal on the output of said input circuits for selecting between said first and second mode select means, switch means for connecting one of said inputs of one of said input circuits to said control pulse creating means whereby said control pulse is used to select the mode of operation of said counter and means responsive to signals in either of said outputs of said input circuits for creating said input counts.

16. A digital counting device as defined in claim 1 including count means for creating random input counts.

17. A digital counting device as defined in claim 16 wherein said count means includes a switch means having first and second conditions, means for selectively shifting said switch means between said conditions and means for creating an input count when said switch means is in said first condition.

18. A digital counting device as defined in claim 17 including feedback means for holding said input count when said switch means is in said first condition.

19. A digital counting device as defined in claim 1 wherein said means for selecting one of said first and second control means includes a control line connected to said counter, means responsive to binary logic on said control line for inhibiting said counter loading means when a given binary logic appears on said control line and means for selectively applying said given binary logic to said control line.

20. A digital counting device as defined in claim 19 wherein said means for selecting one of said first and second control means further includes a first and second terminal and means for directing input pulses to one of said terminals, means responsive to receipt of input pulses on said first terminal for activating said first mode select means and means responsive to receipt of input pulses on said second terminal for activating said second mode select means.

21. A digital counting device as defined in claim 1 wherein said means for selecting one of said first and second control means includes a first and second terminal and means for directing input pulses to one of said terminals, means responsive to receipt of input pulses on said first terminal for activating said first mode select means and means responsive to receipt of input pulses on said second terminal for activating said second mode select means.

22. A digital counting device for counting input pulses, said device including a memory circuit having a selected number of one bit storage units; a counter having one stage corresponding to each of said memory storage units; means for selecting a given digit; means for decoding said digit into a binary code having said selected number of bits of binary information; means for directing said code to said memory units and said counter stages; means for creating a cycle control pulse; first loading means responsive to said cycle control pulse for loading said code into said memory units; second loading means responsive to said cycle control pulse for loading said code into said counter stages; up counting means for causing said counter to count up when receiving a counting pulse; down counting means for causing said counter to count down when receiving a counting pulse; means for creating a succession of counting pulses; sensing means for creating a sense signal when said counter is down counted to zero, comparing means for creating a compare signal when said memory units and said counter stages have the same coded digit; means responsive to either of said sense or said compare signals for creating a second control pulse; first control means including means for actuating said first loading means and means for actuating said up counting means; second control means including means for actuating said second loading means and means for actuating said down counting means; and means for actuating only one of said first and second control means.

23. A digital counting device as defined in claim 22 including means for activating one of said control means in response to said output signal for repeating the counting cycle of said device.

24. A digital counting device as defined in claim 22 including means responsive to said sense signal for shifting from said down counting means to said up counting means during a counting cycle.

25. A digital counting device as defined in claim 22 including means responsive to said output signal for inhibiting said counter.

26. A digital counting device as defined in claim 22 including means for visually displaying the digit in each stage of said counter during the operation of said device.

27. A digital counting device as defined in claim 22 including repeat means responsive to said second control pulse for creating said cycle control pulse.

28. A digital counting device as defined in claim 27 including means for inhibiting said repeat means.

29. A digital counting device as defined in claim 22 including means for creating an output pulse in response to said second control pulse.

30. A digital counting device as defined in claim 29 including means for maintaining said output pulse for a preselected time.

31. A digital counting device as defined in claim 22 including first and second output means, means for creating a first binary logic signal on said first output means before said second control pulse and means for creating a second binary logic signal on said first output after said second control pulse.

32. A digital counting device as defined in claim 31 including means for creating said second binary logic signal on said second output means before said second control pulse and means for creating said first binary logic signal on said second output means after said second control pulse.

33. A digital counting device as defined in claim 32 including means for creating said first binary logic signal on both said first and second output means in response to said second control pulse.

34. A digital counting device as defined in claim 31 including means for creating said first binary logic signal on both said first and second output means in response to said second control pulse.

35. A digital counting device for counting input pulses, said counter including a memory circuit having a selected number of one bit storage units; a counter having one stage corresponding to each of said memory storage units; means for selecting a given digit; means for decoding said digit into a binary code having said selected number of bits of binary information; means for directing said code to said memory units and said counter stages; means for creating a cycle control pulse; first loading means responsive to said cycle control pulse for loading said code into said memory units; second loading means responsive to said cycle control pulse for loading said code into said counter stages; up counting means for causing said counter to count up when receiving a counting pulse; down counting means for causing said counter to count down when receiving a counting pulse; means for creating a succession of counting pulses; sensing means for creating a sense signal when said counter is down counted to zero, comparing means for creating a compare signal when said memory units and said counter stages have the same coded digit; means responsive to either of said sense or said compare signals for creating a second control pulse; first control means including means for actuating said first loading means and said up counting means; second control means including means for actuating said second loading means and said down counting means; and means for actuating only one of said first and second control means.

36. A digital counting device as defined in claim 35 including means for activating one of said control means in response to said output signal for repeating the counting cycle of said device.

37. A digital counting device as defined in claim 35 including means responsive to said sense signal for shifting from said down counting means to said up counting means during a counting cycle.

38. A digital counting device as defined in claim 35 including means responsive to said output signal for inhibiting said counter.

39. A digital counting device as defined in claim 35 including means for visually displaying the digit in each stage of said counter during the operation of said device.

40. A digital counting device as defined in claim 35 including repeat means responsive to said second control pulse for creating said cycle control pulse.

41. A digital counting device as defined in claim 40 including means for inhibiting said repeat means.

42. A digital counting device as defined in claim 35 including means for creating an output pulse in response to said second control pulse.

43. A digital counting device as defined in claim 42 including means for maintaining said output pulse for a preselected time.

44. A digital counting device as defined in claim 35 including first and second output means, means for creating a first binary logic signal on said first output means before said second control pulse and means for creating a second binary logic signal on said first output after said second control pulse.

45. A digital counting device as defined in claim 44 including means for creating said second binary logic signal on said second output means before said second control pulse and means for creating said first binary logic signal on said second output means after said second control pulse.

46. A digital counting device as defined in claim 45 including means for creating said first binary logic signal on both said first and second output means in response to said second control pulse.

47. A digital counting device as defined in claim 44 including means for creating said first binary logic signal on both said first and second output means in response to said second control pulse.

48. A digital counting device for counting input pulses, said counting device comprising: means for producing a binary code representative of a selected number; a binary counter means for binary counting upon receipt of counting pulses; loading means for selectively loading a binary coded number into said counter means; first mode select means for causing said binary counter means to count up; second mode select means for causing said binary counter means to count down; means for starting said counting device; means responsive to said starting means for activating said loading means; pulse generating means for directing counting pulses to said counter means; first and second input means for directing input pulses to said pulse generating means for causing said counting pulses; means for directing input pulses to a selected one of said input means; means responsive to actuation of the selected one of said input means for actuating one of said mode select means whereby said counting means counts in the direction determined by the input means of said input pulses; and pulse discriminating means associated with said first and second input means for preventing simultaneous actuation of said generating means by said first and second input means.

49. A digital counting device as defined in claim 48 wherein said pulse discriminating means includes a first pulse discriminating circuit connected between said first input means and said generating means, a second pulse discriminating circuit connected between said second input means and said generating means, means for creating a succession of first and second gating pulses having a frequency substantially greater than said input pulses, and means in said discriminating circuits for stepping said input pulses through said discriminating pulses in response to said gating pulses whereby said gating pulses step the first of two input pulses applied separately to said first and second input means and then steps the second of said two input pulses.

50. A digital counting device for counting input pulses, said counting device comprising: a binary counter means for binary counting upon receipt of counting pulses; means for starting said counting device; pulse generating means for directing counting pulses to said counter means; first mode select means for causing said binary counter means to count up; second mode select means for causing said binary counter means to count down; first and second input means for directing input pulses to said generating means for causing said counting pulses; and pulse discriminating means associated with said first and second input means for preventing simultaneous actuation of said generating means by said first and second input means.

51. A digital counting device as defined in claim 50 wherein said pulse discriminating means includes a first pulse discriminating circuit connected between said first input means and said generating means, a second pulse discriminating circuit connected between said second input means and said generating means, means for creating a succession of first and second gating pulses having a frequency substantially greater than said input pulses, and means in said discriminating circuits for stepping said input pulses through said discriminating pulses in response to said gating pulses whereby said gating pulses step the first of two input pulses applied separately to said first and second input means and then steps the second of said two input pulses.

52. A digital counting device as defined in claim 1 wherein said binary counter, said binary memory circuit and said interconnecting means are provided on a MOS-FET chip.

53. A digital counting device as defined in claim 52 wherein said means for creating a sense signal are provided on said MOS-FET chip.

54. A digital counting device as defined in claim 53 wherein said first and second control means are provided on said MOS-FET chip.

55. A digital counting device as defined in claim 1 wherein said binary counter, said binary memory circuit and said interconnecting means are provided on an LSI chip.

56. A digital counting device as defined in claim 22 wherein said counter and said memory circuit are provided on a MOS-FET chip.

57. A digital counting device as defined in claim 56 wherein said comparing means is provided on said MOS-FET chip.

58. A digital counting device as defined in claim 57 wherein said sensing means for creating a sense signal is provided on said MOS-FET chip.

59. A digital counting device as defined in claim 56 wherein said first and second control means are provided on said MOS-FET chip.

60. A digital counting device as defined in claim 22 wherein said counter and said memory circuit are provided on an LSI chip.

61. A digital counting device as defined in claim 35 wherein said memory circuit and said counter are provided on a MOS-FET chip.

62. A digital counting device as defined in claim 61 wherein said comparing means is provided on said MOS-FET chip.

63. A digital counting device as defined in claim 61 wherein said sensing means for creating a sense signal is provided on said MOS-FET chip.

64. A digital counting device as defined in claim 61 wherein said first and second control means are provided on said MOS-FET chip.

65. A digital counting device as defined in claim 35 wherein said memory circuit and said counter are provided on an LSI chip.

66. A digital counting device as defined in claim 50 wherein said binary counter means is provided on a MOS-FET chip.

67. A digital counting device as defined in claim 50 wherein said binary counter means is provided on an LSI chip.

68. A digital timing device for counting input control pulses and producing an output signal after a given number of said input control pulses, said timing device comprising a binary counter provided on a MOS-FET chip, said binary counter having a first control means for causing it to count up when receiving a counting pulse and a second control means for causing it to count down when receiving a counting pulse; means for selectively energizing one of said first and second control means; means for creating input control pulses at a rate which is a multiple of six pulses per second; means for creating five counting pulses from each six of said input control pulses; and means for directing said counting pulses to said binary counter.

69. A digital timing device as defined in claim 68 wherein said input pulse creating means includes means for creating 120 input control pulses per second.

70. A digital timing device for counting input control pulses and producing an output signal after a given number of said input control pulses, said timing device comprising a binary counter provided in a MOS-FET chip, said binary counter having a first control means for causing it to count up when receiving a counting pulse and a second control means for causing it to count down when receiving a counting pulse; means for selectively energizing one of said first and second control means; means for creating input control pulses at a rate which is a multiple of six pulses per second; means for creating a preselected ratio of counting pulses to said control pulses; and, means for directing said counting pulses to said binary counter.

71. A digital timing device as defined in claim 70 wherein said input pulse creating means includes means for creating 120 input control pulses per second.

72. A digital timing device for counting input control pulses and producing an output signal after a given number of said input control pulses, said timing device comprising a binary counter provided on an LSI chip, said binary counter having a first control means for causing it to count up when receiving a counting pulse and a second control means for causing it to count down when receiving a counting pulse; means for selectively energizing one of said first and second control means; means for creating input control pulses at a rate which is a multiple of six pulses per second; means for creating five counting pulses from each six of said input control pulses; and means for directing said counting pulses to said binary counter.

73. A digital timing device as defined in claim 72 wherein said input pulse creating means includes means for creating 120 input control pulses per second.

74. A digital timing device for counting input control pulses and producing an output signal after a given number of said input control pulses, said timing device comprising a binary counter provided in an LSI chip, said binary counter having a first control means for causing it to count up when receiving a counting pulse and a second control means for causing it to count down when receiving a counting pulse; means for selectively energizing one of said first and second control means; means for creating input control pulses at a rate which is a multiple of six pulses per second; means for creating a preselected ratio of counting pulses to said control pulses; and, means for directing said counting pulses to said binary counter.

75. A digital timing device as defined in claim 74 wherein said input pulse creating means includes means for creating 120 input control pulses per second.

76. A MOS-FET chip for use in a digital counting device for counting input pulses, said MOS-FET chip including a memory circuit having a selected number of one bit storage units; a counter having one stage corresponding to each of said memory storage units; means for directing binary coded digital information to said memory units and said counter stages; means for creating a cycle control pulse; first loading means responsive to said cycle control pulse for loading said binary coded information into said memory units; second loading means responsive to said cycle control pulse for loading said binary coded information into said counter stages; up counting means for causing said counter to count up when receiving a counting pulse; down counting means for causing said counter to count down when receiving a counting pulse; means for receiving a succession of counting pulses; sensing means for creating a sense signal when said counter is down counted to zero, comparing means for creating a compare signal when said memory units and said counter stages have the same coded digital information; means responsive to either of said sense or said compare signals for creating a second control pulse; first control means including means for actuating said first loading means and means for actuating said up counting means; second control means including means for actuating said second loading means and means for actuating said down counting means; and means for actuating only one of said first and second control means.

77. An LSI chip for use in a digital counting device for counting input pulses, said LSI chip including a memory circuit having a selected number of one bit storage units; a counter having one stage corresponding to each of said memory storage units; means for directing binary coded digital information to said memory units and said counter stages; means for creating a cycle control pulse; first loading means responsive to said cycle control pulse for loading said binary coded information into said memory units; second loading means responsive to said cycle control pulse for loading said binary coded information into said counter stages; up counting means for causing said counter to count up when receiving a counting pulse; down counting means for causing said counter to count down when receiving a counting pulse; means for receiving a succession of counting pulses; sensing means for creating a sense signal when said counter is down counted to zero, comparing means for creating a compare signal when said memory units and said counter stages have the same coded digital information; means responsive to either of said sense or said compare signals for creating a second control pulse; first control means including means for actuating said first loading means and means for actuating said up counting means; second control means including means for actuating said second loading means and means for actuating said down counting means; and means for actuating only one of said first and second control means.

78. A MOS-FET chip for use in a digital counting device for counting input pulses, said MOS-FET chip including a memory circuit having a selected number of one bit storage units; a counter having one stage corresponding to each of said memory storage units; means for directing binary coded digital information to said memory units and said counter stages; means for creating a cycle control pulse; first loading means responsive to said cycle control pulse for loading said code into said memory units; second loading means responsive to said cycle control pulse for loading said code into said counter stages; up counting means for causing said counter to count up when receiving a counting pulse; down counting means for causing said counter to count down when receiving a counting pulse; means for creating a succession of counting pulses; sensing means for creating a sense signal when said counter is down counted to zero, comparing means for creating a compare signal when said memory units and said counter stages have the same coded digit; means responsive to either of said sense or said compare signals for creating a second control pulse; first control means including means for actuating said first loading means and said up counting means; second control means including means for actuating said second loading means and said down counting means; and means for actuating only one of said first and second control means.

79. An LSI chip fir use in a digital counting device for counting input pulses, said LSI chip including a memory circuit having a selected number of one bit storage units; a counter having one stage corresponding to each of said memory storage units; means for directing binary coded digital information to said memory units and said counter stages; means for creating a cycle control pulse; first loading means responsive to said cycle control pulse for loading said code into said memory units; second loading means responsive to said cycle control pulse for loading said code into said counter stages; up counting means for causing said counter to count up when receiving a counting pulse; down counting means for causing said counter to count down when receiving a counting pulse; means for creating a succession of counting pulses; sensing means for creating a sense signal when said counter is down counted to zero, comparing means for creating a compare signal when said memory units and said counter stages have the same coded digit; means responsive to either of said sense or said compare signals for creating a second control pulse; first control means including means for actuating said first loading means and said up counting means; second control means including means for actuating said second loading means and said down counting means; and means for actuating only one of said first and second control means.

80. A MOS-FET chip for use in a digital counting device for counting input pulses, said MOS-FET chip comprising: a binary counter means for binary counting upon receipt of counting pulses; means for starting said counting device; pulse generating means for directing counting pulses to said counter means; first mode select means for causing said binary counter means to count up; second mode select means for causing said binary counter means to count down; first and second input means for directing input pulses to said generating means for causing said counting pulses; and pulse discriminating means associated with said first and second input means for preventing simultaneous actuation of said generating means by said first and second input means.

81. An LSI chip for use in a digital counting device for counting input pulses, said LSI chip comprising: a binary counter means for binary counting upon receipt of counting pulses; means for starting said counting device; pulse generating means for directing counting pulses to said counter means; first mode select means for causing said binary counter means to count up; second mode select means for causing said binary counter means to count down; first and second input means for directing input pulses to said generating means for causing said counting pulses; and pulse discriminating means associated with said first and second input means for preventing simultaneous actuation of said generating means by said first and second input means.

* * * * *